United States Patent

Kawamura et al.

[11] Patent Number: 4,946,989
[45] Date of Patent: Aug. 7, 1990

[54] OPTICALLY ACTIVE COMPOUND

[75] Inventors: Ichiro Kawamura, Kanagawa; Yoshio Imai, Tokyo, both of Japan

[73] Assignee: Showa Shell Sekiyu Kabushiki Kaisha, Tokyo, Japan

[21] Appl. No.: 223,641

[22] Filed: Jul. 25, 1988

[30] Foreign Application Priority Data

Jul. 27, 1987 [JP] Japan .................. 62-185580

[51] Int. Cl.$^5$ ............................. C07C 69/76
[52] U.S. Cl. ................... 560/51; 252/299.67
[58] Field of Search ............... 350/350.5; 252/299.67, 252/299.01; 560/51

[56] References Cited

U.S. PATENT DOCUMENTS

| | | | |
|---|---|---|---|
| 4,115,310 | 9/1978 | Sato et al. | 252/299.01 |
| 4,596,667 | 6/1986 | Inukai et al. | 252/299.65 |
| 4,676,925 | 6/1987 | Inoue et al. | 252/299.65 |
| 4,737,313 | 4/1988 | Saito et al. | 252/299.63 |
| 4,834,907 | 5/1989 | Inoue et al. | 252/299.65 |
| 4,886,623 | 12/1989 | Mitsuhashi et al. | 252/299.65 |

FOREIGN PATENT DOCUMENTS

| | | | |
|---|---|---|---|
| 164814 | 12/1985 | European Pat. Off. | |
| 53-88677 | 8/1978 | Japan | 252/299.67 |

OTHER PUBLICATIONS

CA 98:208005m (1983).

Primary Examiner—John S. Maples
Assistant Examiner—Richard Treanor
Attorney, Agent, or Firm—Darby & Darby

[57] ABSTRACT

A compound of

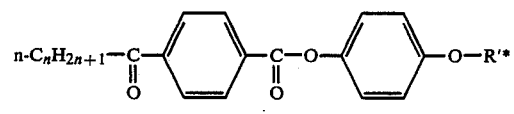

(wherein n is an integer from 2 to 15; R' is

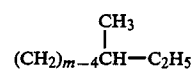

m is total number of carbon atoms in R' and is an integer from 5 to 12, and * mark shows asymmetric carbon atom) which is useful for an electric indicative element of liquid crystal is provided.

2 Claims, 36 Drawing Sheets

COMPOUND NO, 1~8  WHILE TEMPERATURE IS INCREASING

COMPOUND NO, 1~8  WHILE TEMPERATURE IS DECREASING

COMPOUND NO, 17～24 WHILE TEMPERATURE IS INCREASING

COMPOUND NO, 17～24 WHILE TEMPERATURE IS DECREASING

COMPOUND NO. 25~32 WHILE TEMPERATURE IS INCREASING

COMPOUND NO. 25~32 WHILE TEMPERATURE IS DECREASING

OPTICALLY ACTIVE COMPOUND

BACKGROUND OF THE INVENTION

The present compound is a ferroelectric one having high speed of response to electric fields and is useful as a material for an electric indicative element of liquid crystal.

A large number of compounds have been proposed, for example,

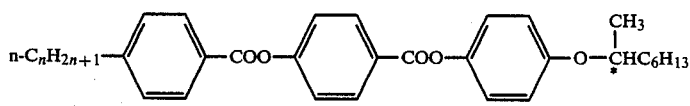

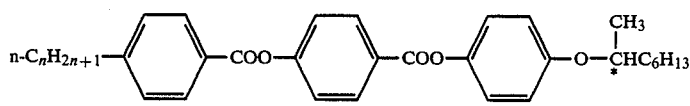

(Japan Kokai No. 61-271252), and

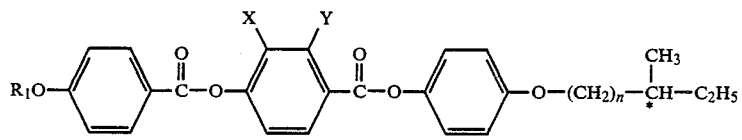

(wherein $R_1$ is a $C_{6-18}$ alkyl group; X and Y are respectively hydrogen atom, halogen atom or a methyl group) (Japan Kokai No. 61-251639).

One requirement for this sort of compound useful as an electric indicative element is that a compound is able to transit to liquid crystal phase at a temperature near room temperature and that it is photochemically and chemically stable.

The present compound has the formula

Figure 1:
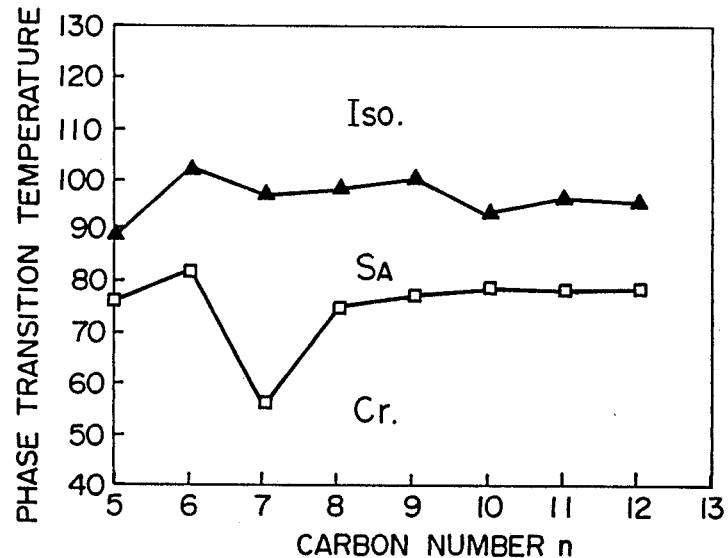
FIGS. 1–8 are graphs which depict the phase transition temperature of the compounds of the present invention.
Figure 2:
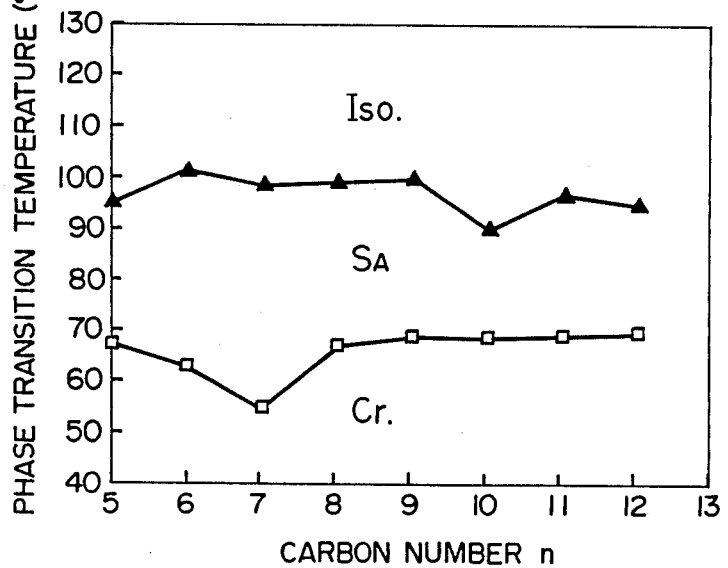
Figure 3:
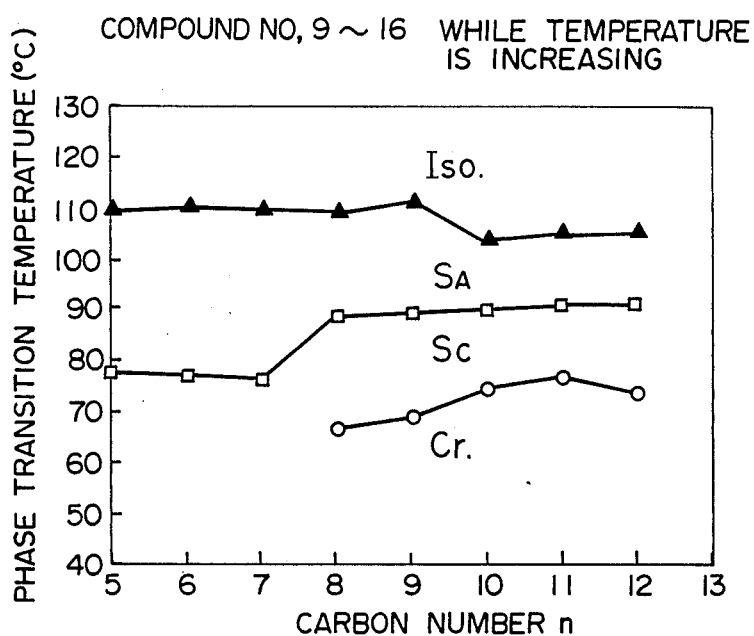
Figure 4:
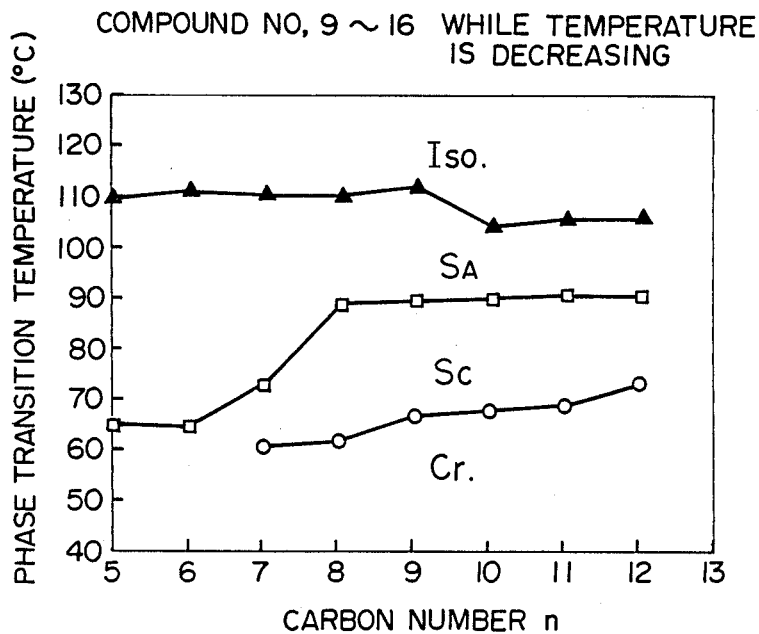
Figure 5:
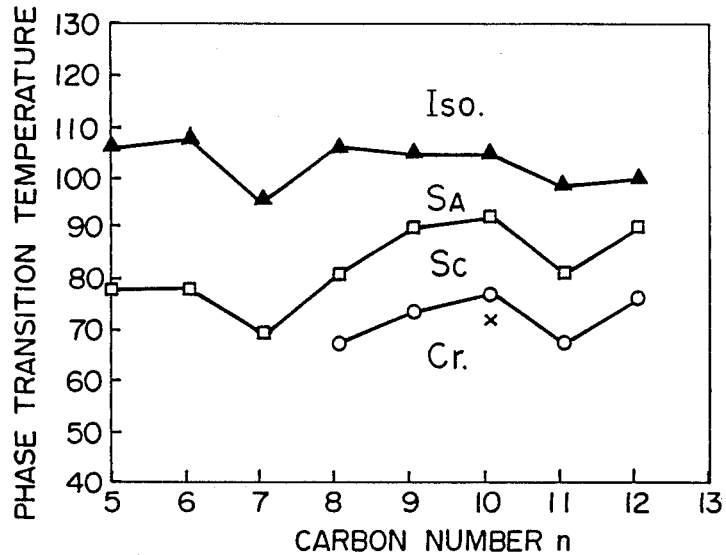
Figure 6:
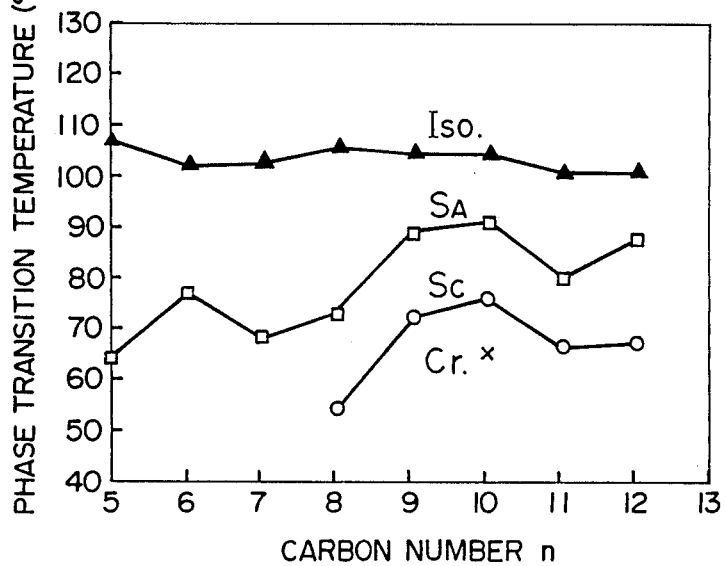
Figure 7:
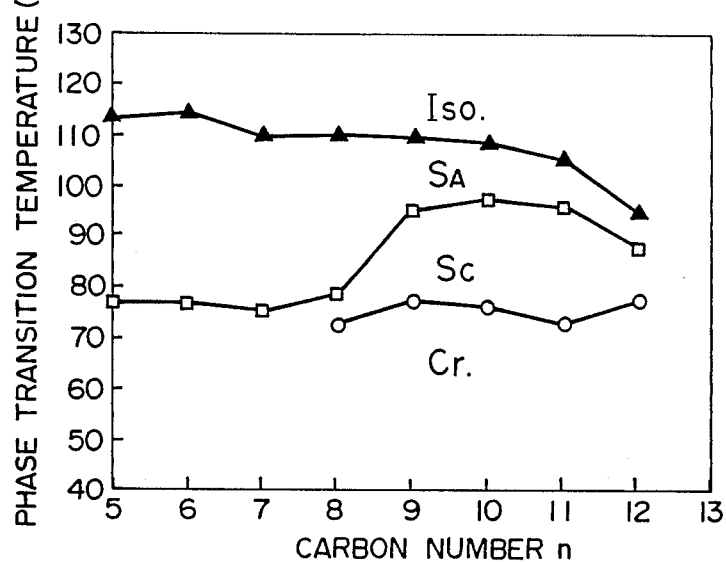
Figure 8:
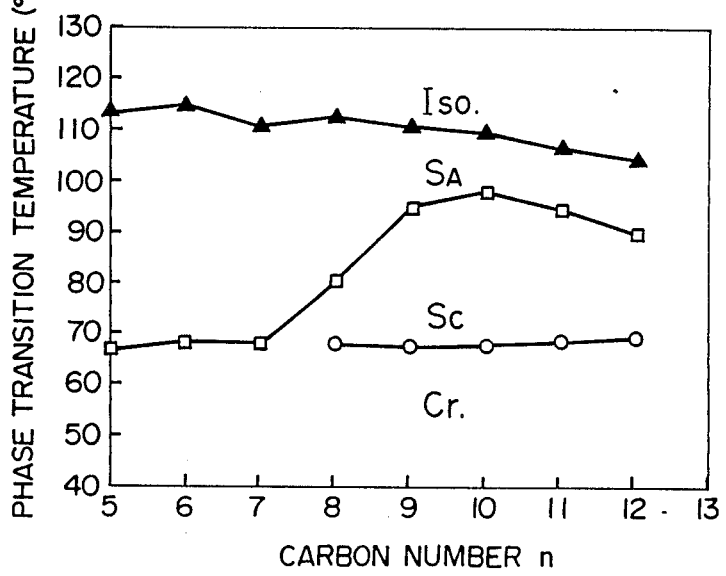

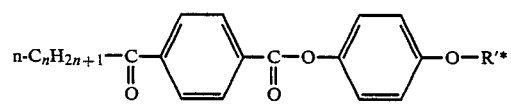
(V)

wherein n is an integer from 2 to 15; R' is

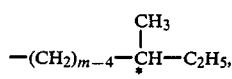

m is total number of carbon atoms in R' and is an integer from 5 to 12, and * mark shows asymmetric carbon atom.

The present compound is prepared in the following process:

(1)

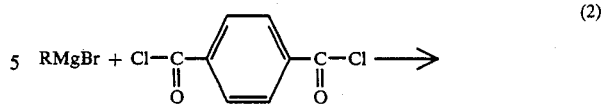
(2)

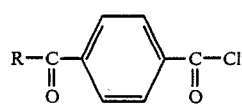
(I)

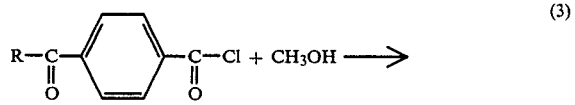
(3)

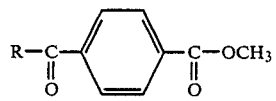
(II)

(4)

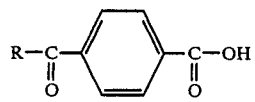
(III)

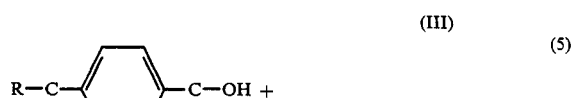
(III)

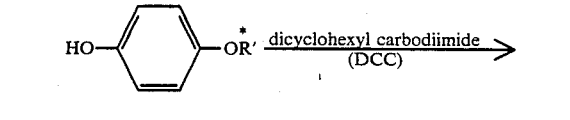
(IV)

(5)

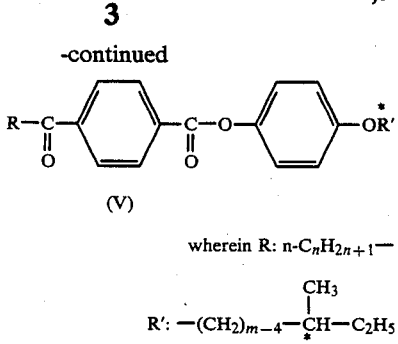

(V)

wherein R: n-$C_nH_{2n+1}$—

R': —$(CH_2)_{m-4}$—$\overset{*}{\underset{|}{CH}}$—$C_2H_5$
                        $CH_3$ Terephthalic acid dichloride is converted to 4-alkanoylbenzoic acid chloride (I) by use of a Grignard reagent. The compound (I) is esterified to obtain methyl ester (II). The ester (II) is hydrolyzed to obtain 4-n-alkanoylbenzoic acid (III).

The compound (III) is allowed to react with optically active 4-alkyloxyphenol (IV) in a solvent of dicyclohexyl carbodiimide (DDC) and tetrahydrofuran (THF) in the presence of 4-dimethylaminopyridine, to obtain optically active 4-alkyloxyphenyl 4'-n-alkanoylbenzoate (V).

The present compound has high speed of response to electric fields, spontaneous polarization ability and phase transition temperature near room temperature, so that it is useful for a ferroelectric liquid crystal display.

EXAMPLES

Preparation method and physical properties of the compounds obtained are shown in the following non-limitative examples.

EXAMPLE 1

Optically active 4-alkyloxyphenyl 4'-n-alkanoylbenzoate (formula V) in which n=5 and m=5

(1) 4-n-Hexanoylbenzoic acid (A) n-Pentylbromide (100.0 g, 0.662 mol) in THF (200 ml)
(B) Mg (16.1 g, 0.662 mol) in THF (50 ml)

A part of (A) was charged in (B) to cause a reaction at room temperature. The remainder of (A) was added in dropwise over one hour and ten minutes. After the addition was over, the mixture was refluxed under heating for 3 hours. Reflux was further continued for 2 hours in the presence of cadmium chloride (60.7 g), before cooling. The Grignard reagent thus prepared was added drop by drop to terephthalyl chloride (268.6 g, 1.324 mol) solution in THF (1 l) over 50 minutes. After being stirred for 2 hours at room temperature, the mixture was heated to 50° C. and stirred for 15 hours. Furthermore, methanol (200 ml) and pyridine (170 ml) were added at room temperature and stirring was continued for 2 hours. The solution was filtered and filtrate was distilled under reduced pressure. The residue obtained was subjected to colmun chromatography (silica gel). The ester obtained (71.0 g) was recrystallized in methanol to obtain a purufied product (44.4 g) which was hydrolyzed with alcoholic caustic potash to obtain n-hexanoylbenzoic acid (37.6 g, yield 25.8%).

(2) Objective ester

Figure 9:
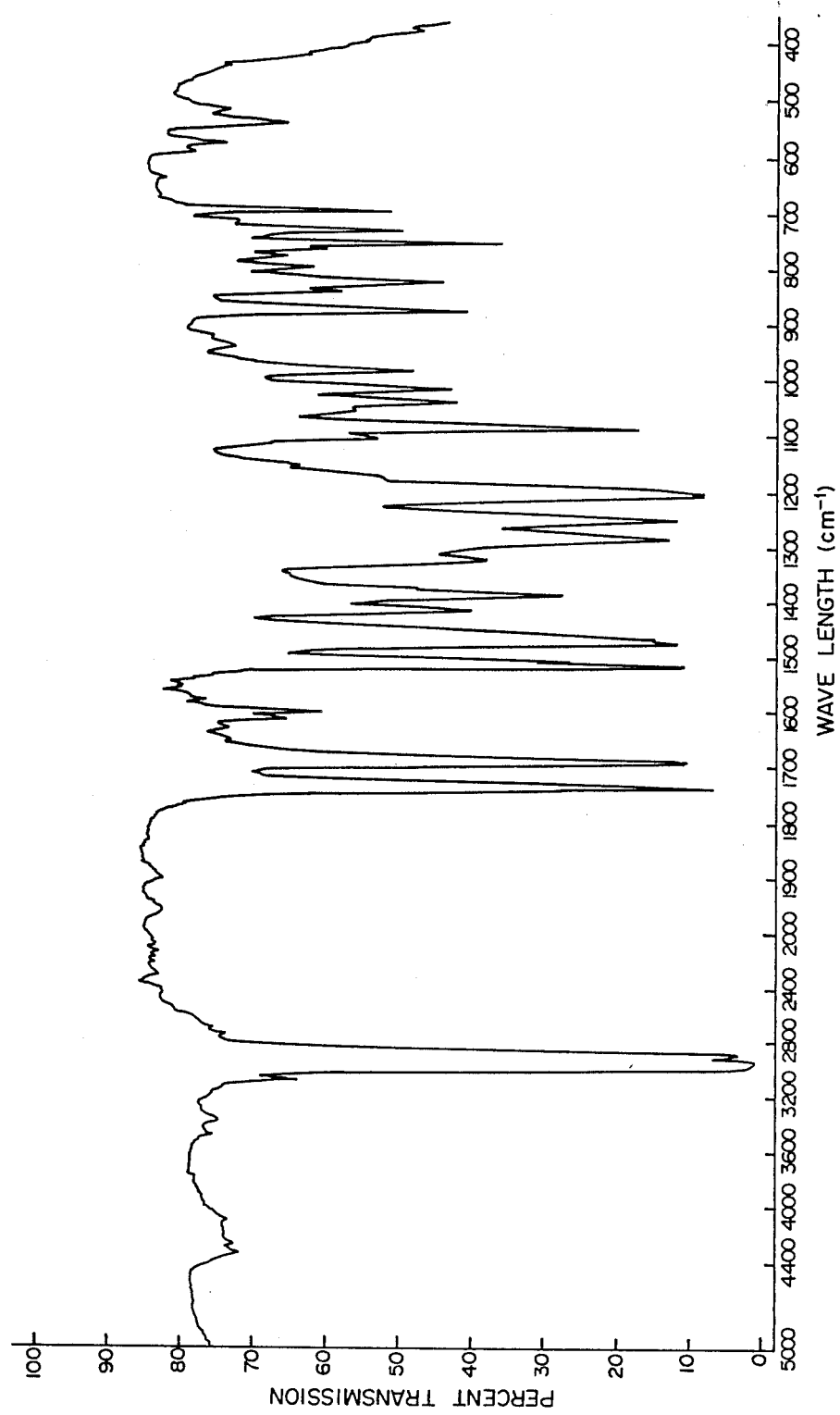
FIGS. 9–40 are each IR spectrum of the compounds of the present invention.
Figure 10:
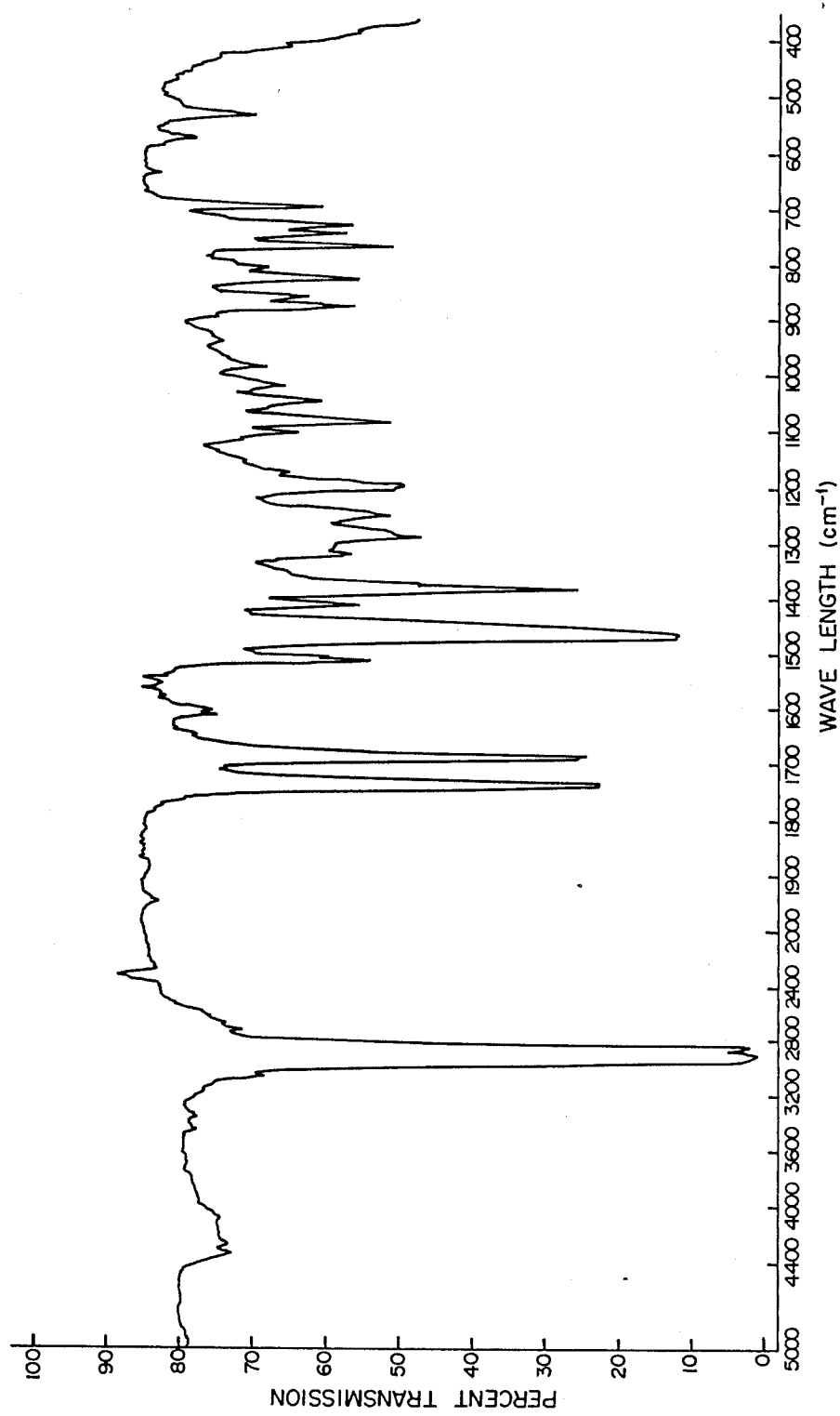
Figure 11:
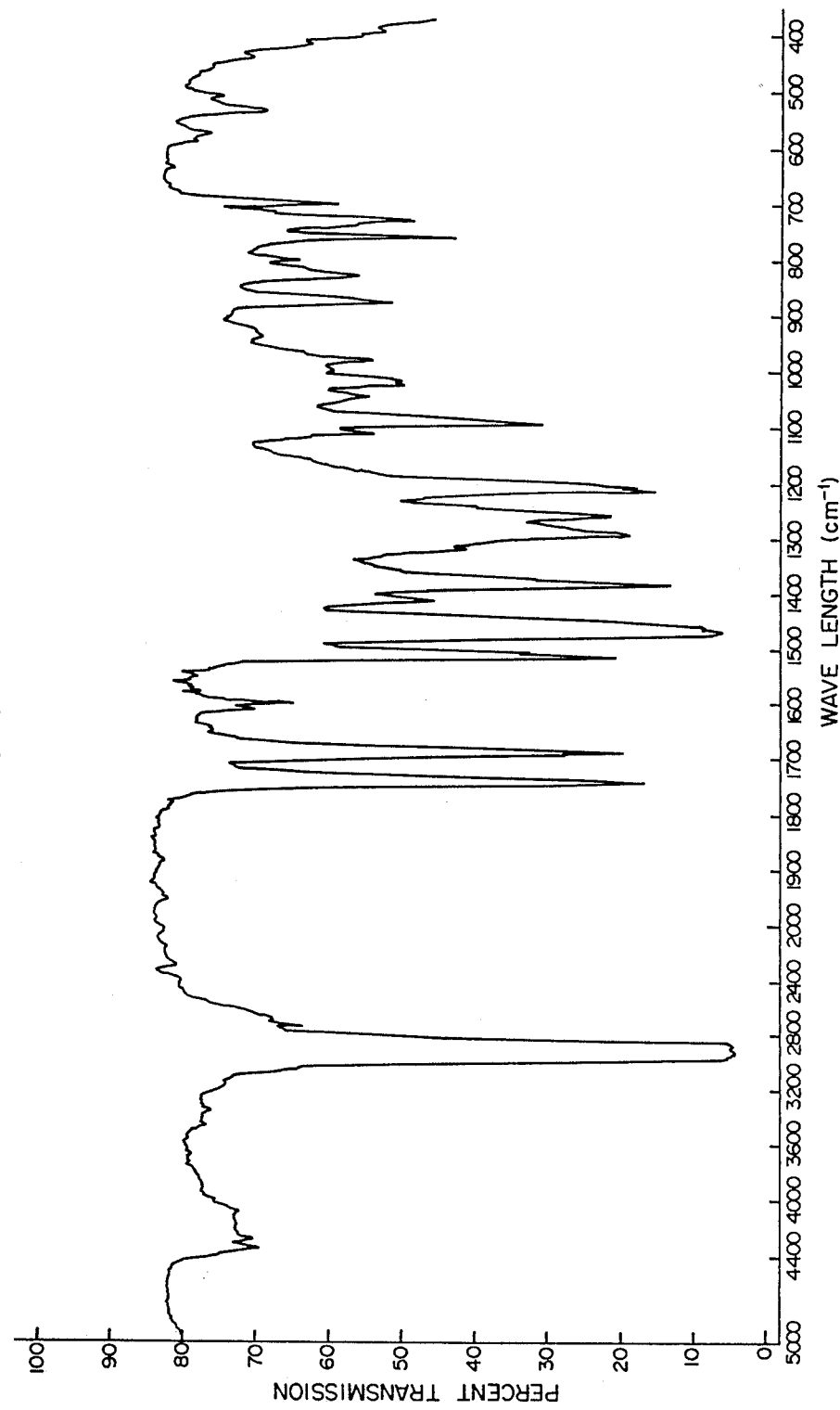
Figure 12:
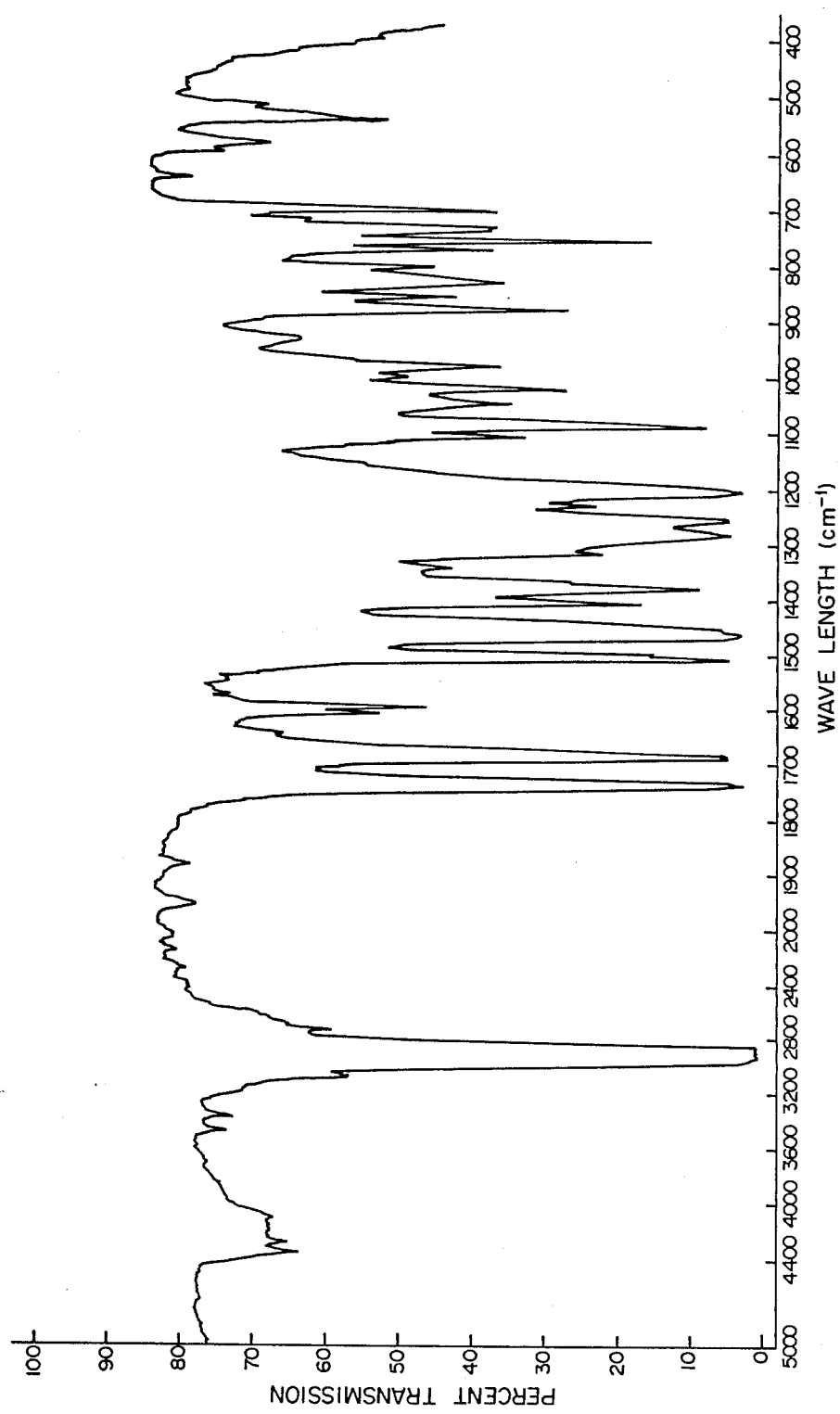
Figure 13:
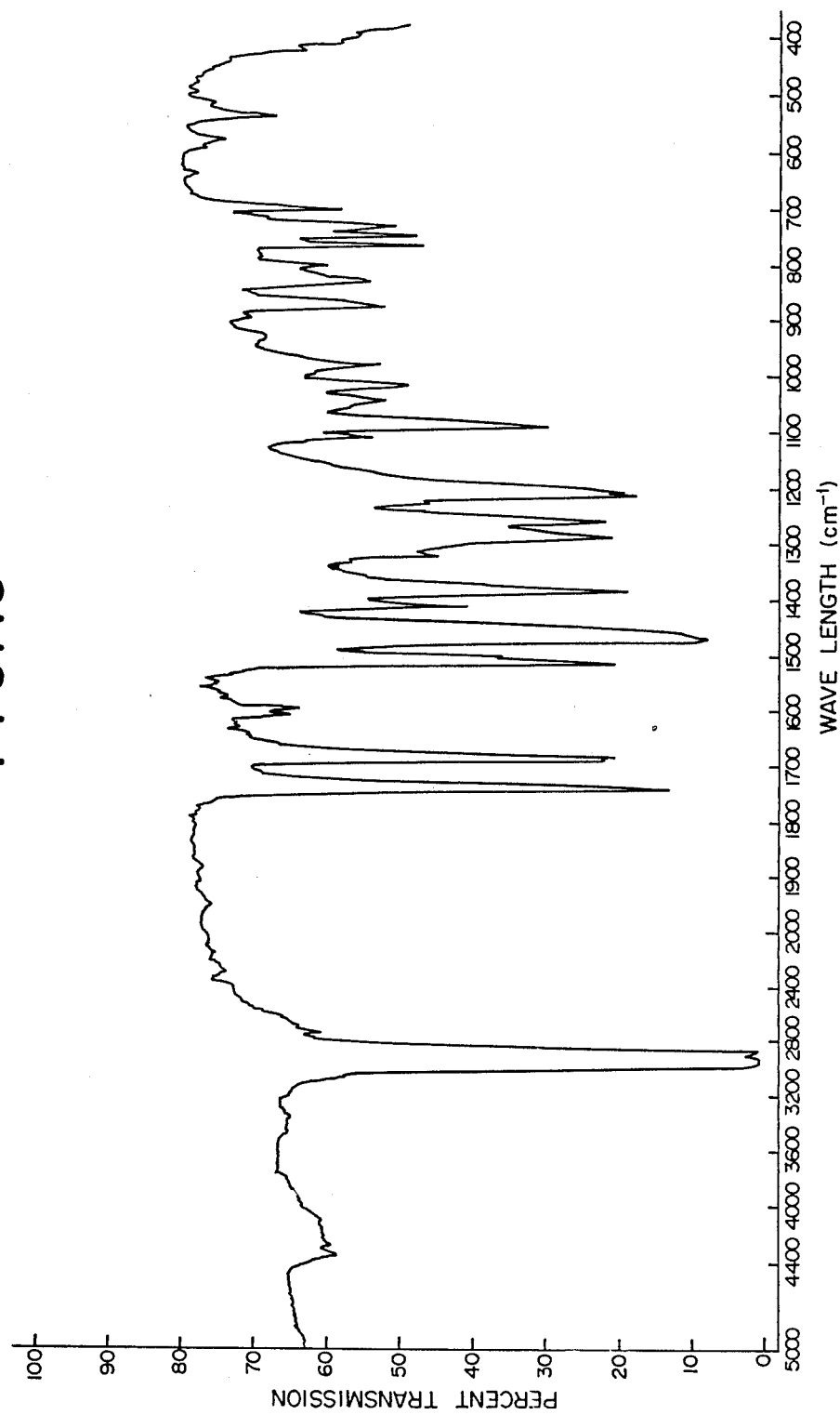
Figure 14:
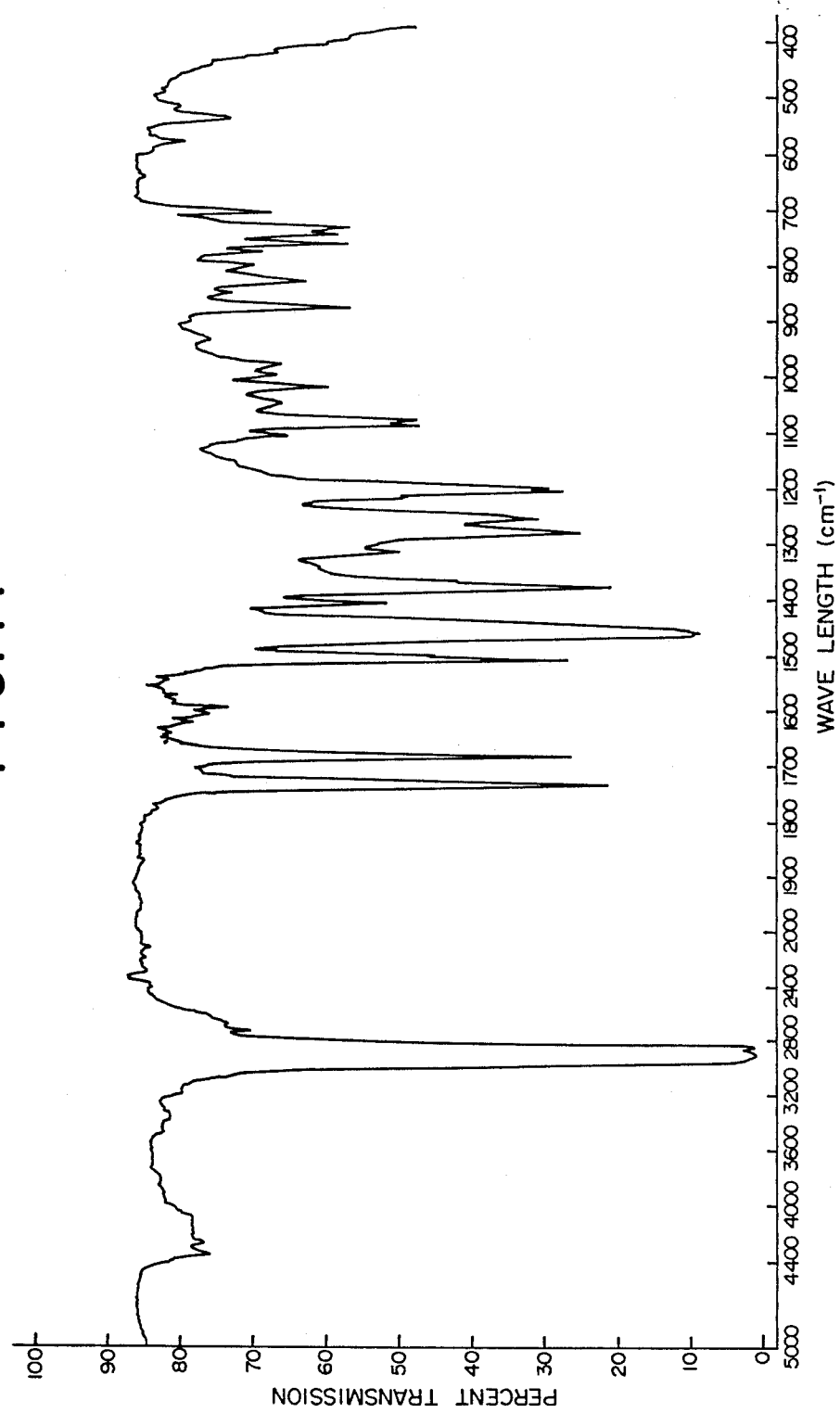
Figure 15:
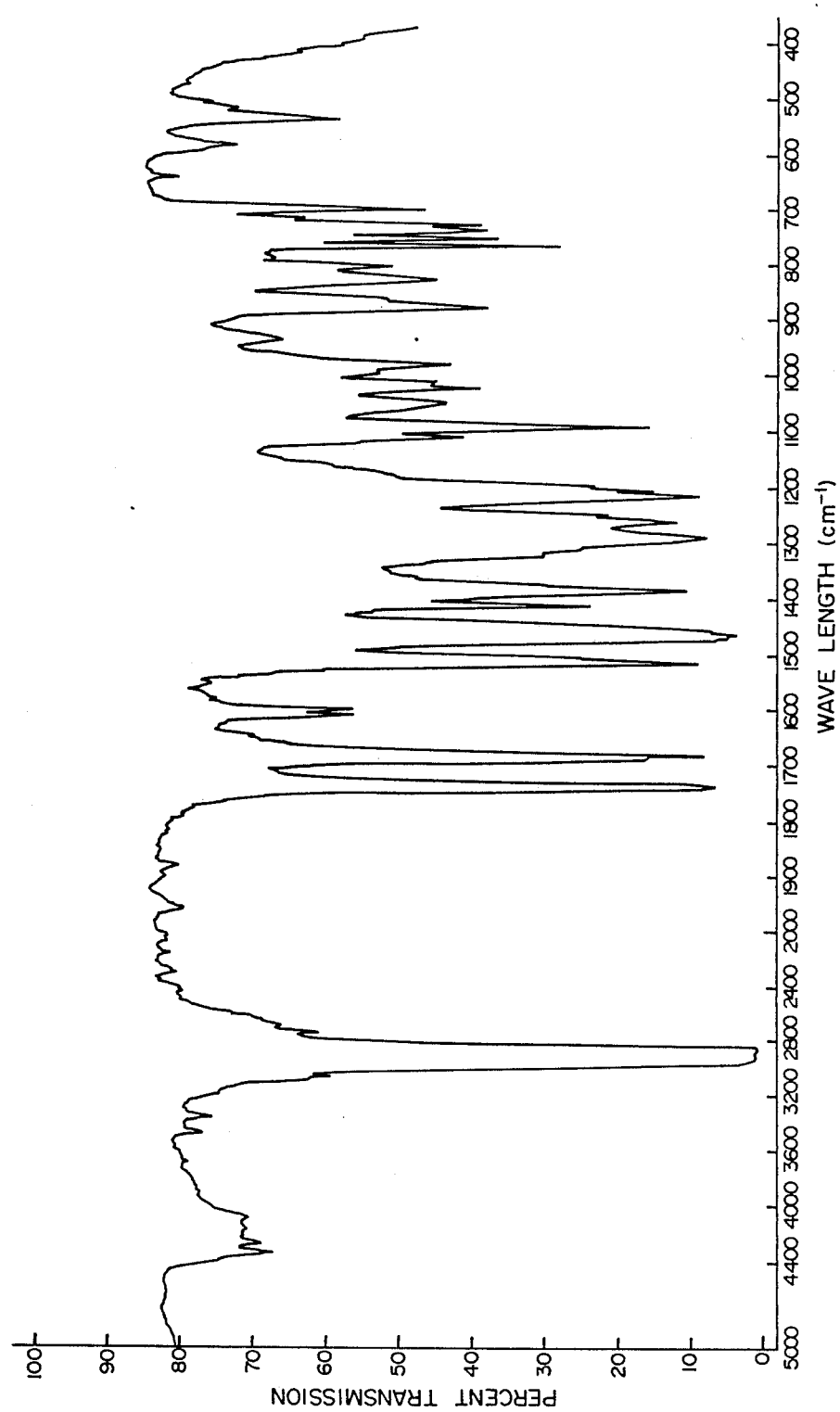
Figure 16:
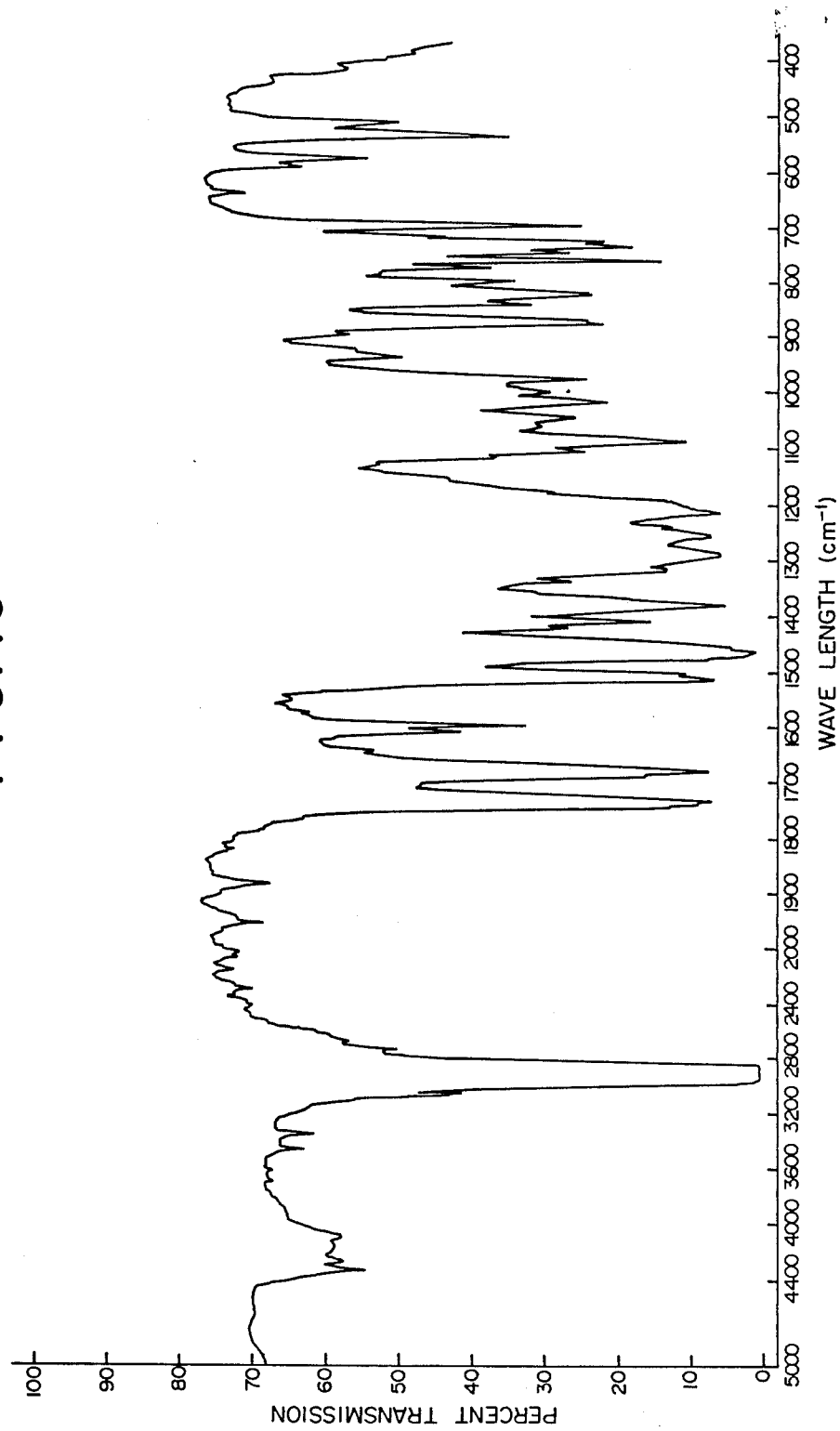

To anhydrous tetrahydrofuran (THF, 60 ml) were added n-hexanoylbenzoic acid (20 mmol), optically active 4-(2-methylbutoxy)phenol (20 mmol), dicyclohexyl carbodiimide (DCC) (22 mmol) and a small amount of 4-dimethylaminopyridine. The mixture was stirred for 2 hours at room temperature. After an insoluble matter was filtered, the mixture was distilled to remove THF. The residue was recrystallized a few times in ethanol to obtain the objective ester (9 mmol, No. 1). IR-spectrum of the ester is shown in FIG. 9.

Compounds where n=5 and m=7, 8 and 9 in the formula (V) were prepared in the similar manner. That is, compounds (Nos. 9, 17 and 25) were prepared by using optically active 4-(4-methylhexoxy)phenol, 4-(5-methylheptoxy)phenyl and 4-(6-methyloctoxy)phenol, respectively, in place of the above optically active 4-(2-methylbutoxy)phenol.

Figure 17:
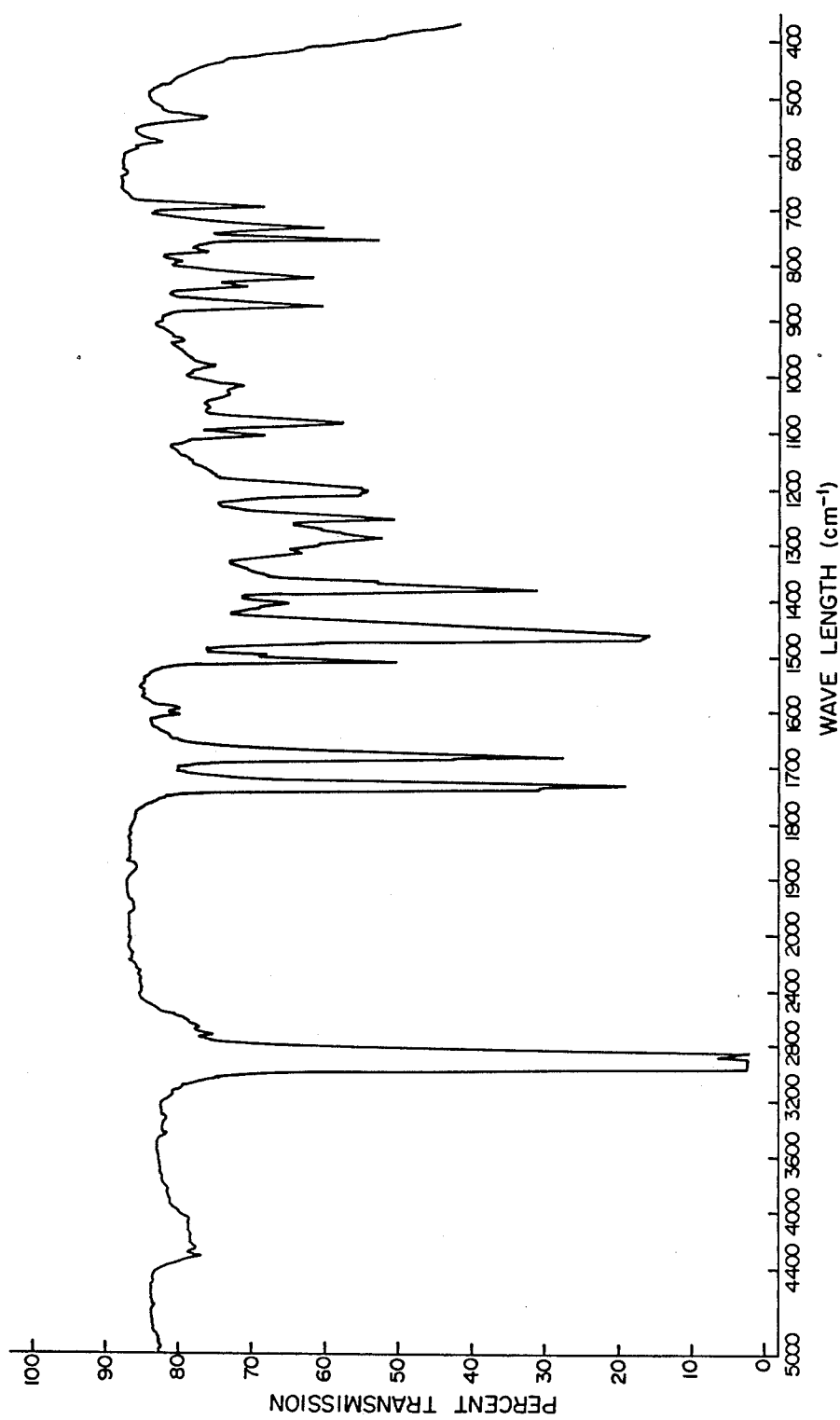
Figure 18:
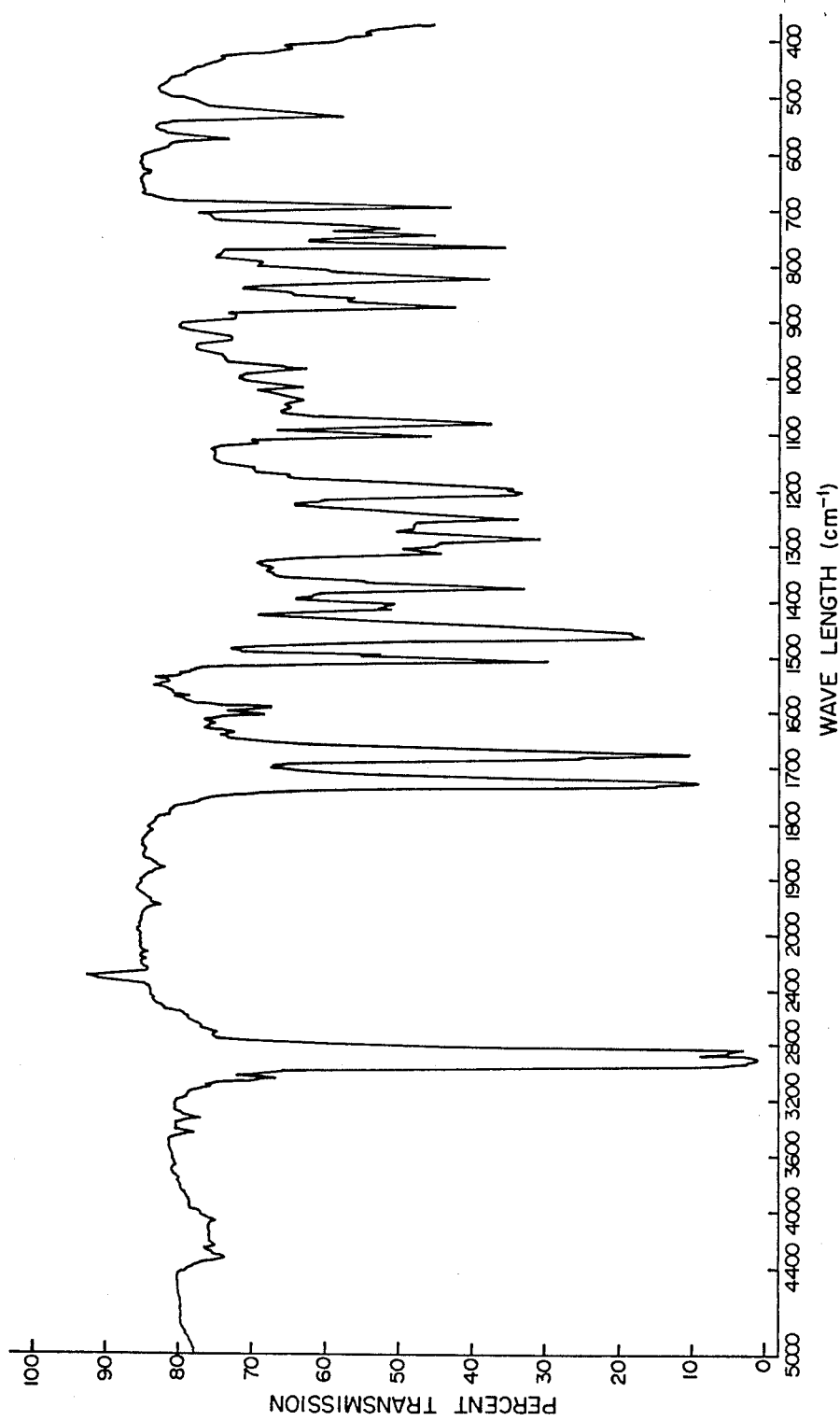
Figure 19:
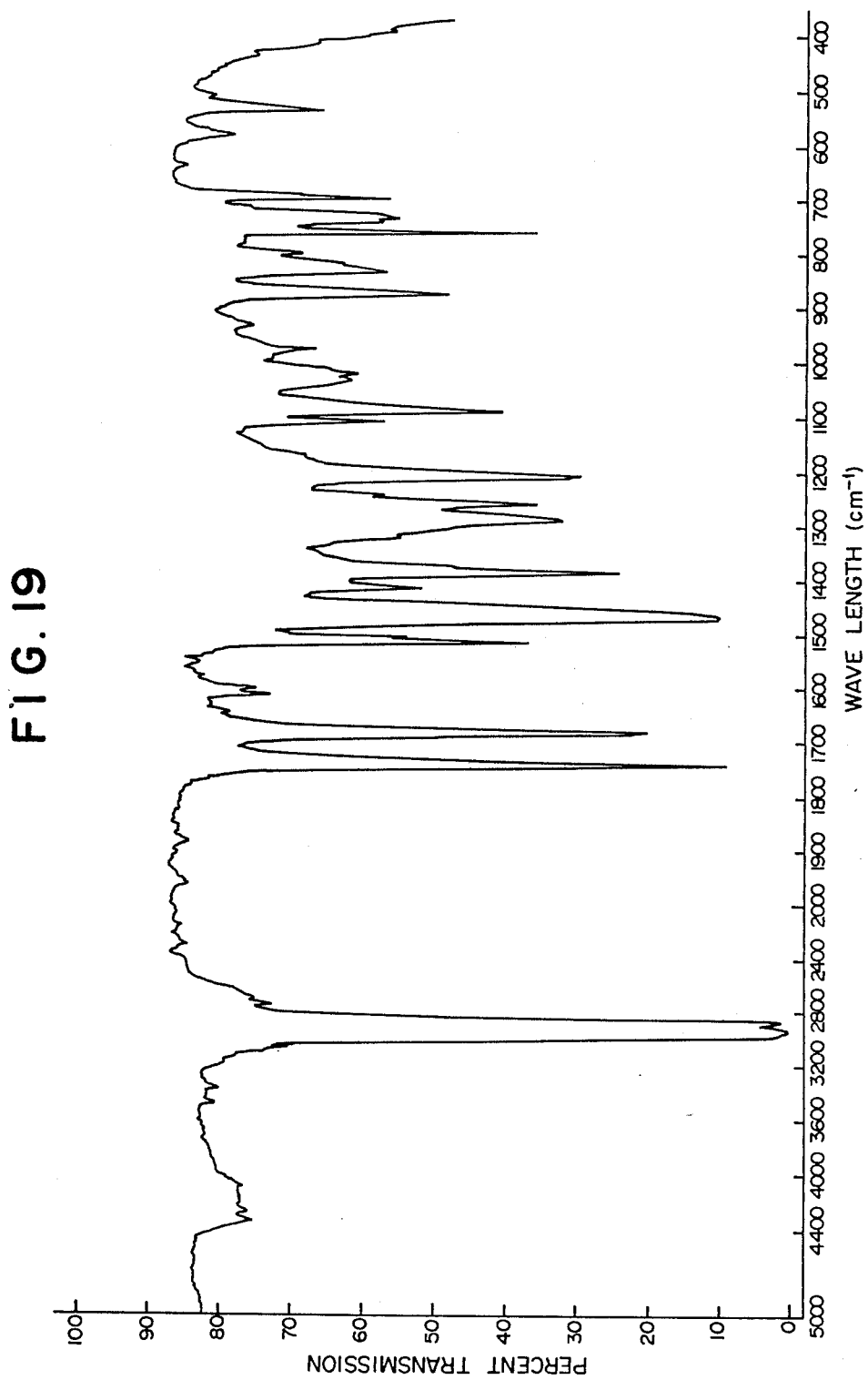
Figure 20:
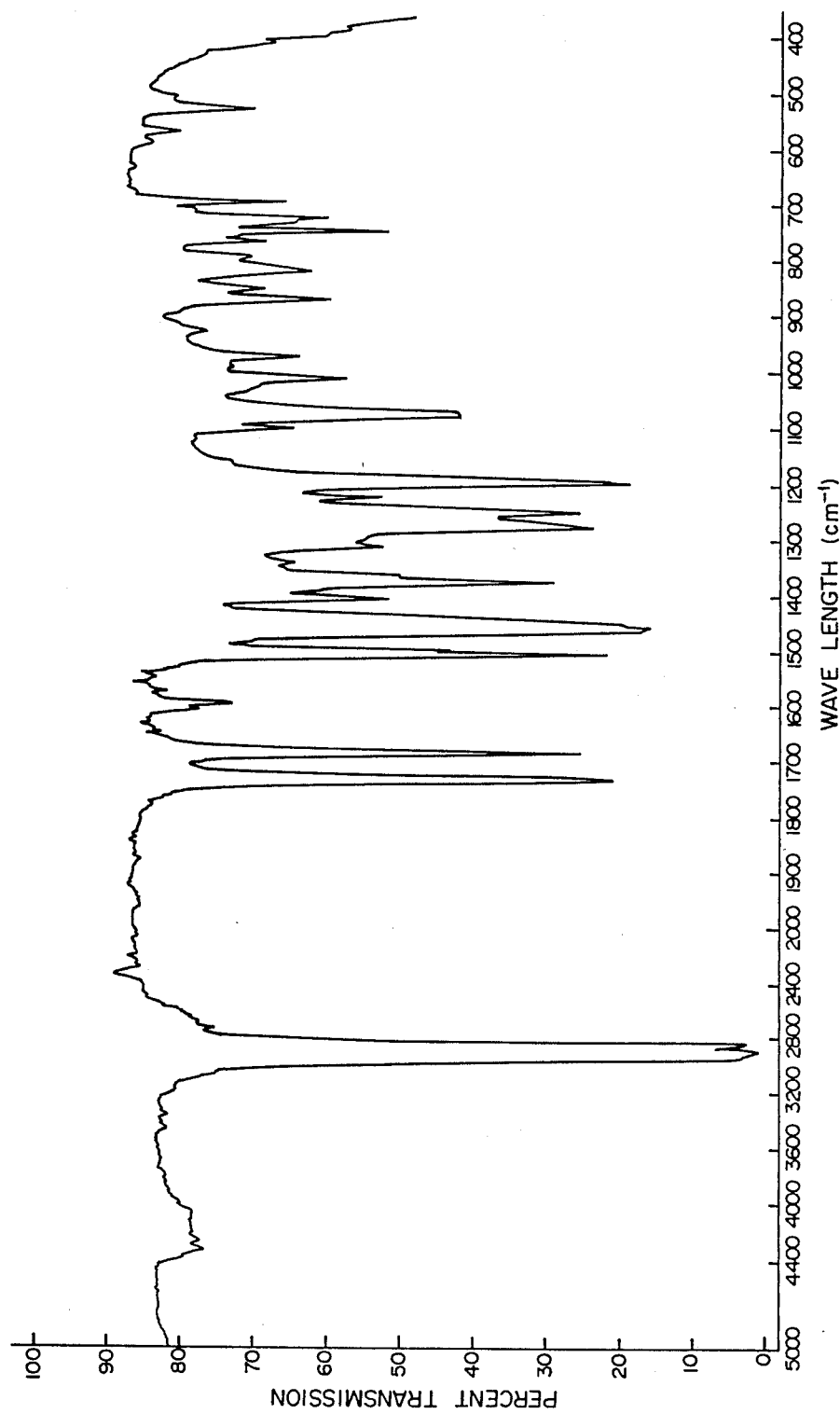
Figure 21:
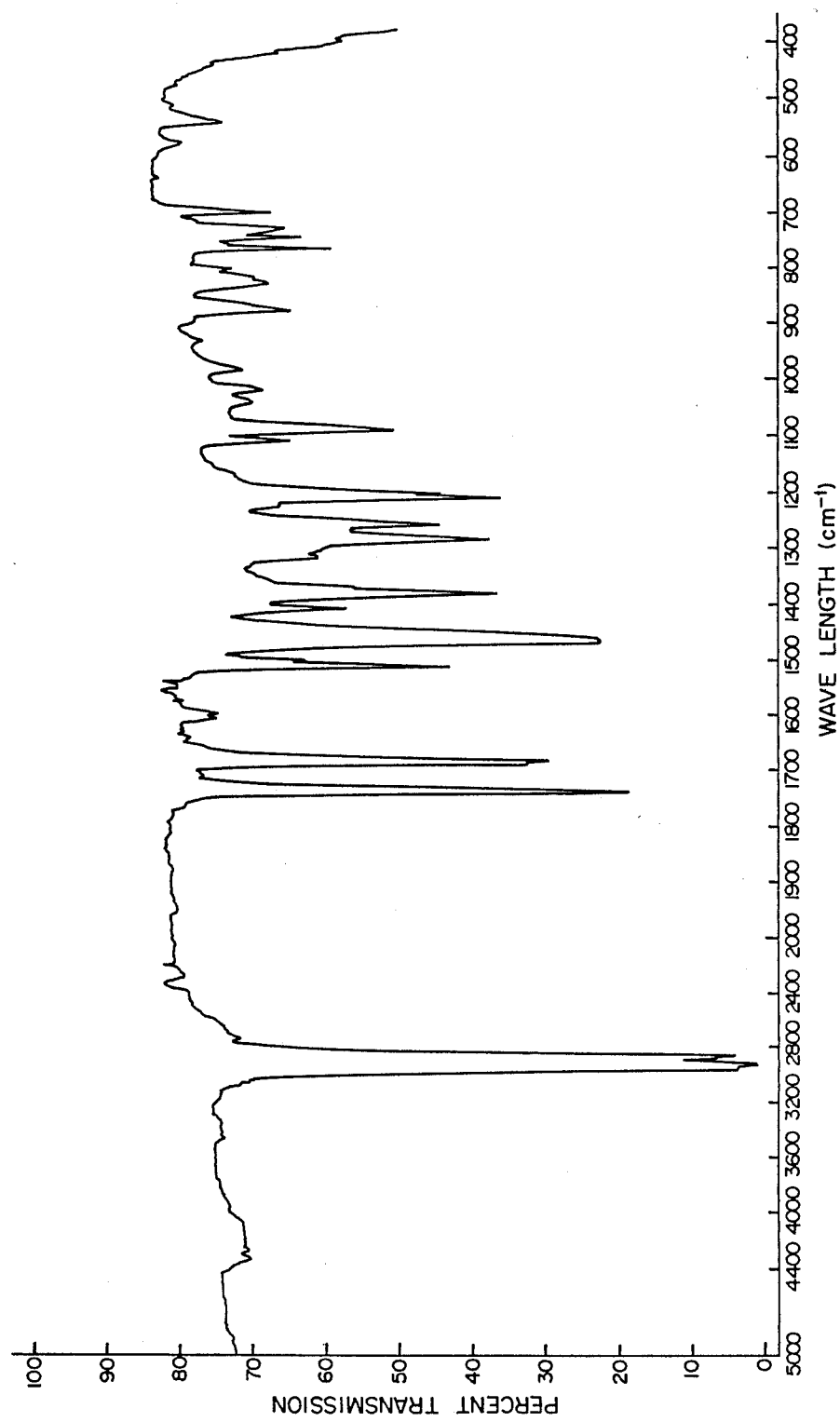
Figure 22:
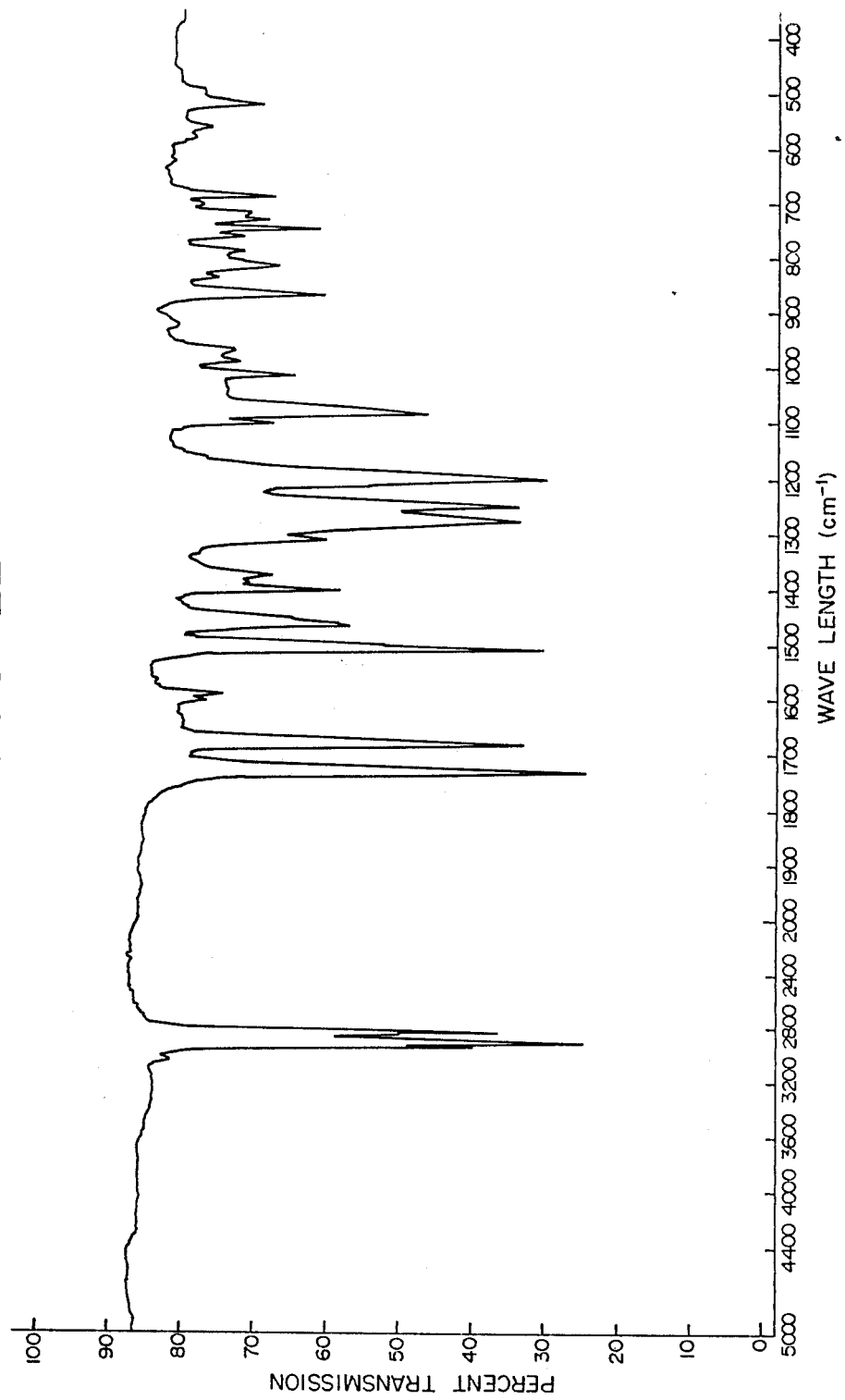
Figure 23:
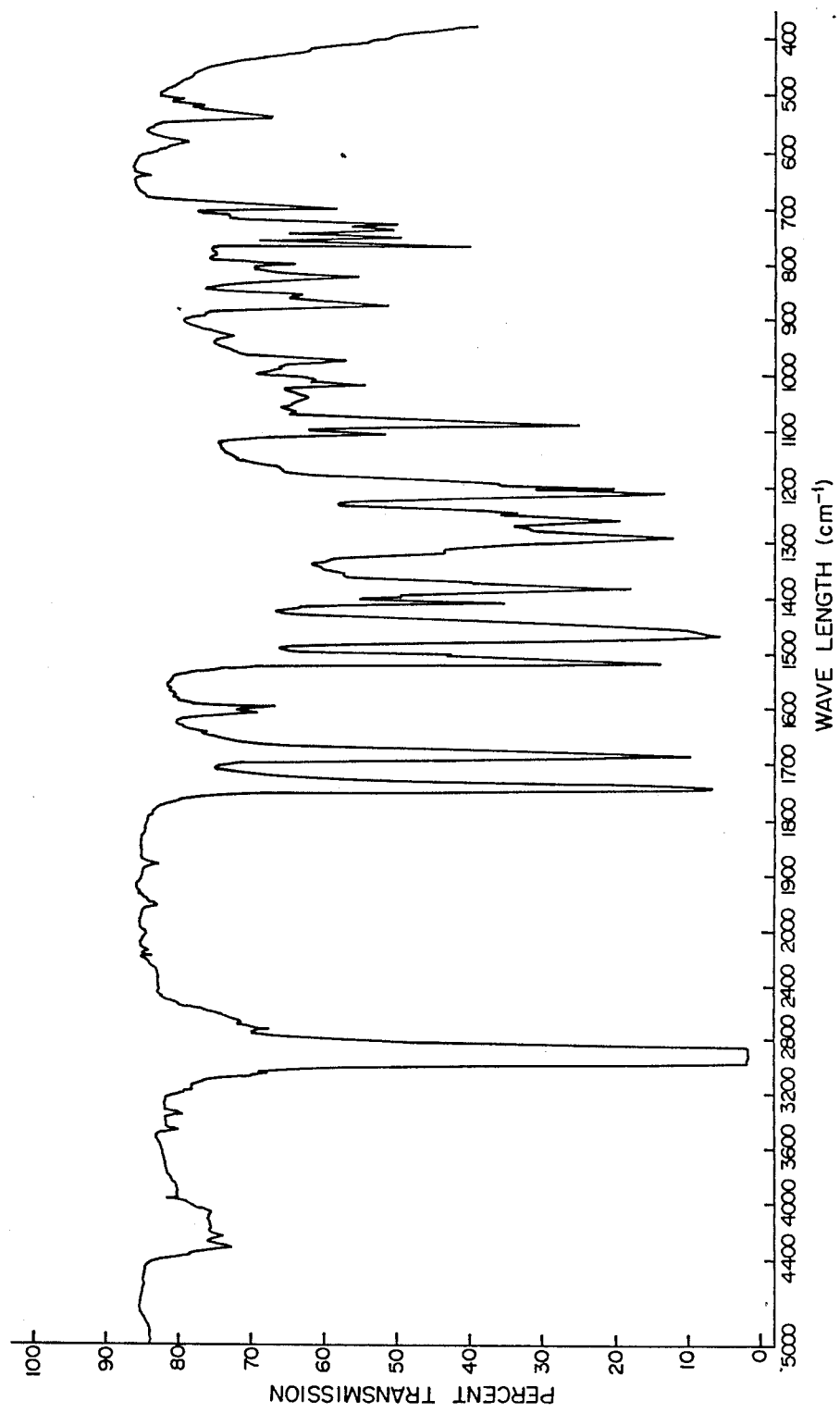
Figure 24:
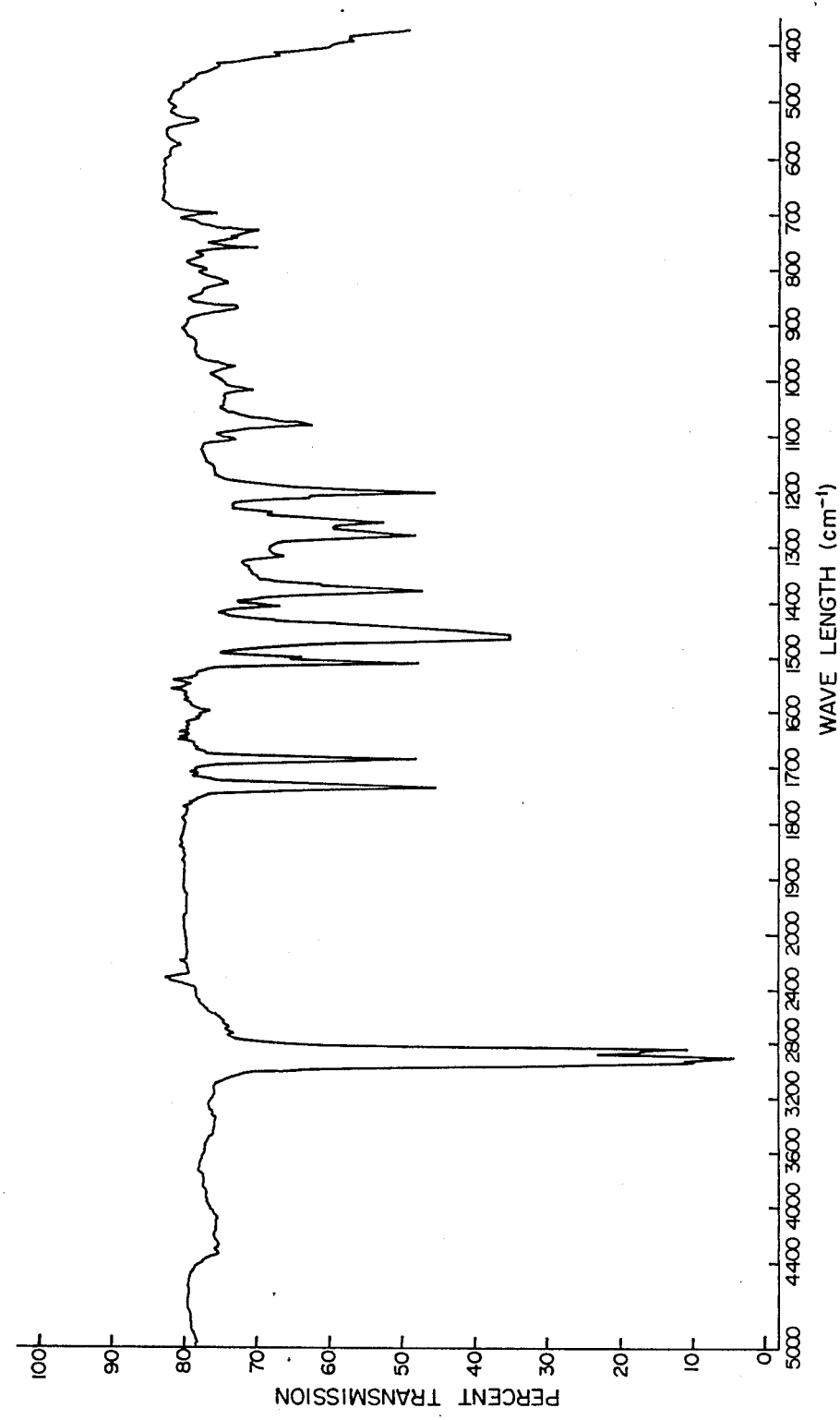
Figure 25:
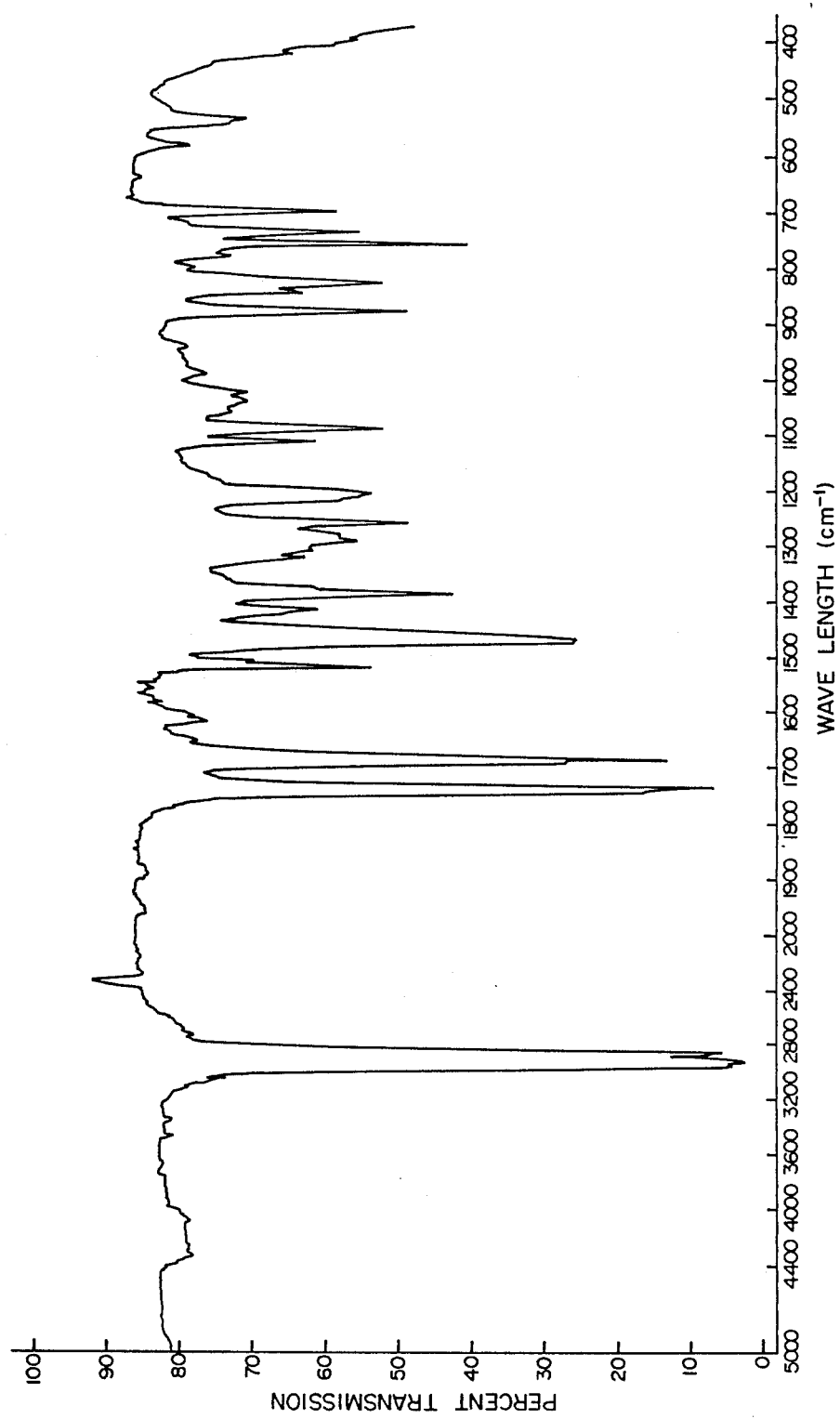
Figure 26:
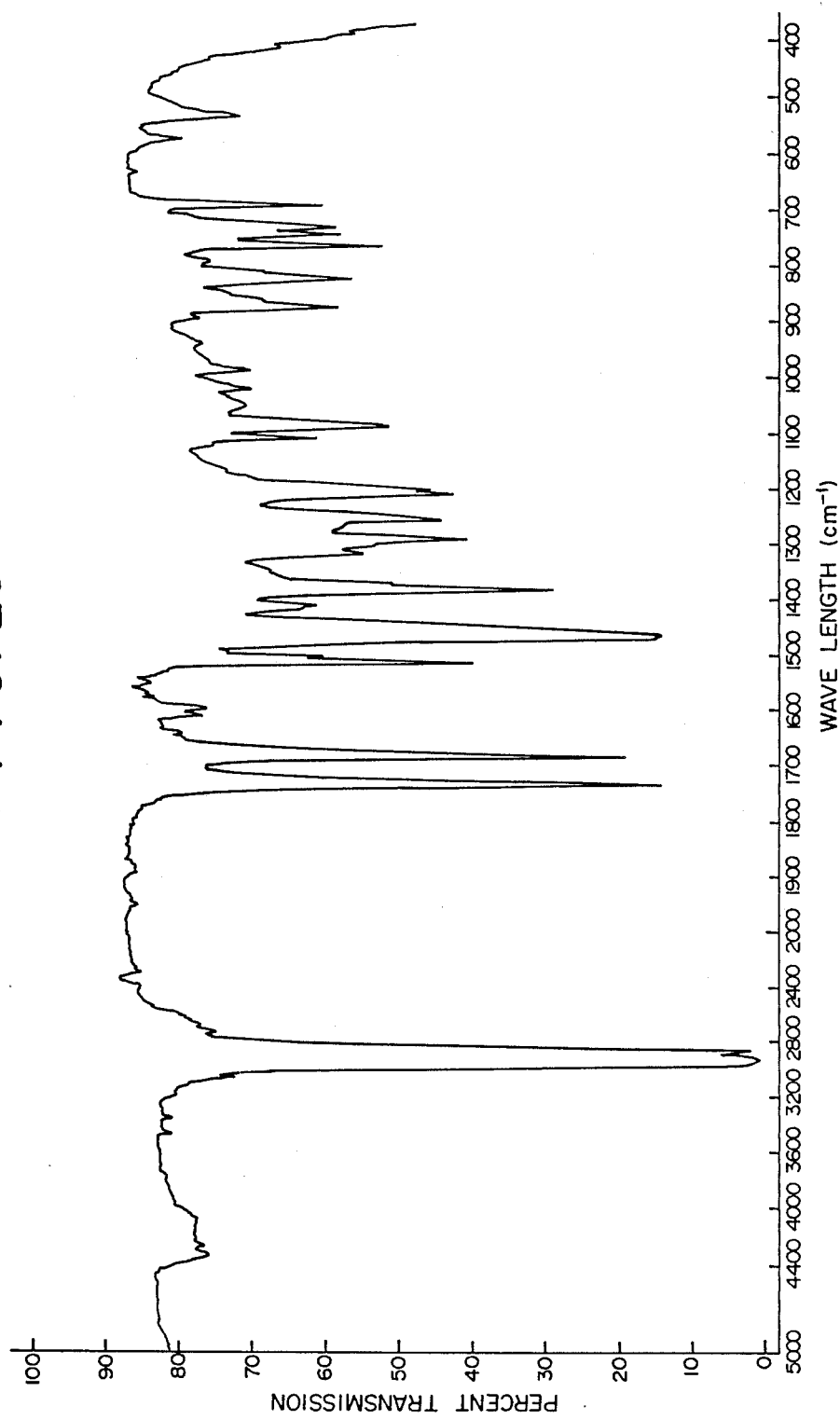
Figure 27:
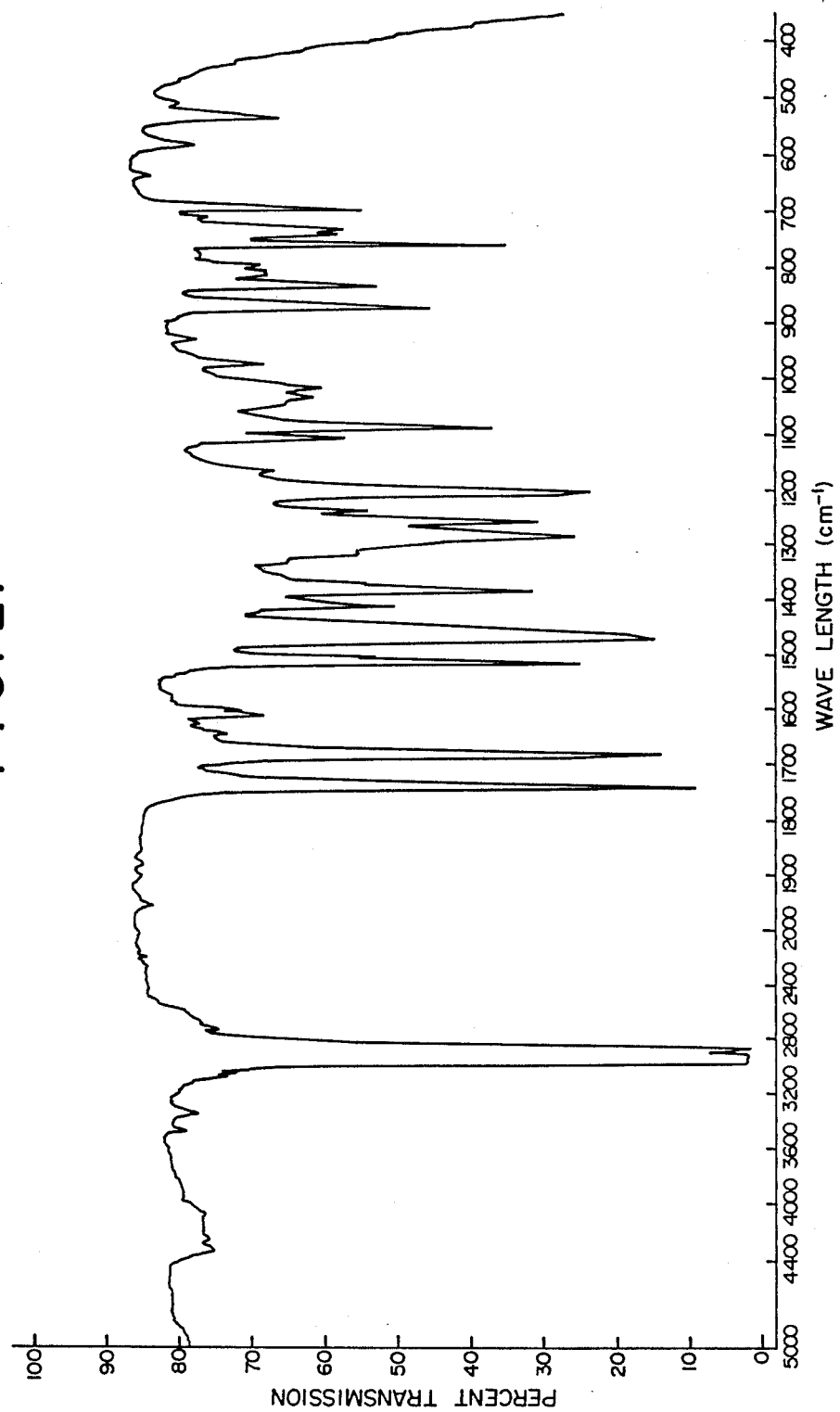
Figure 28:
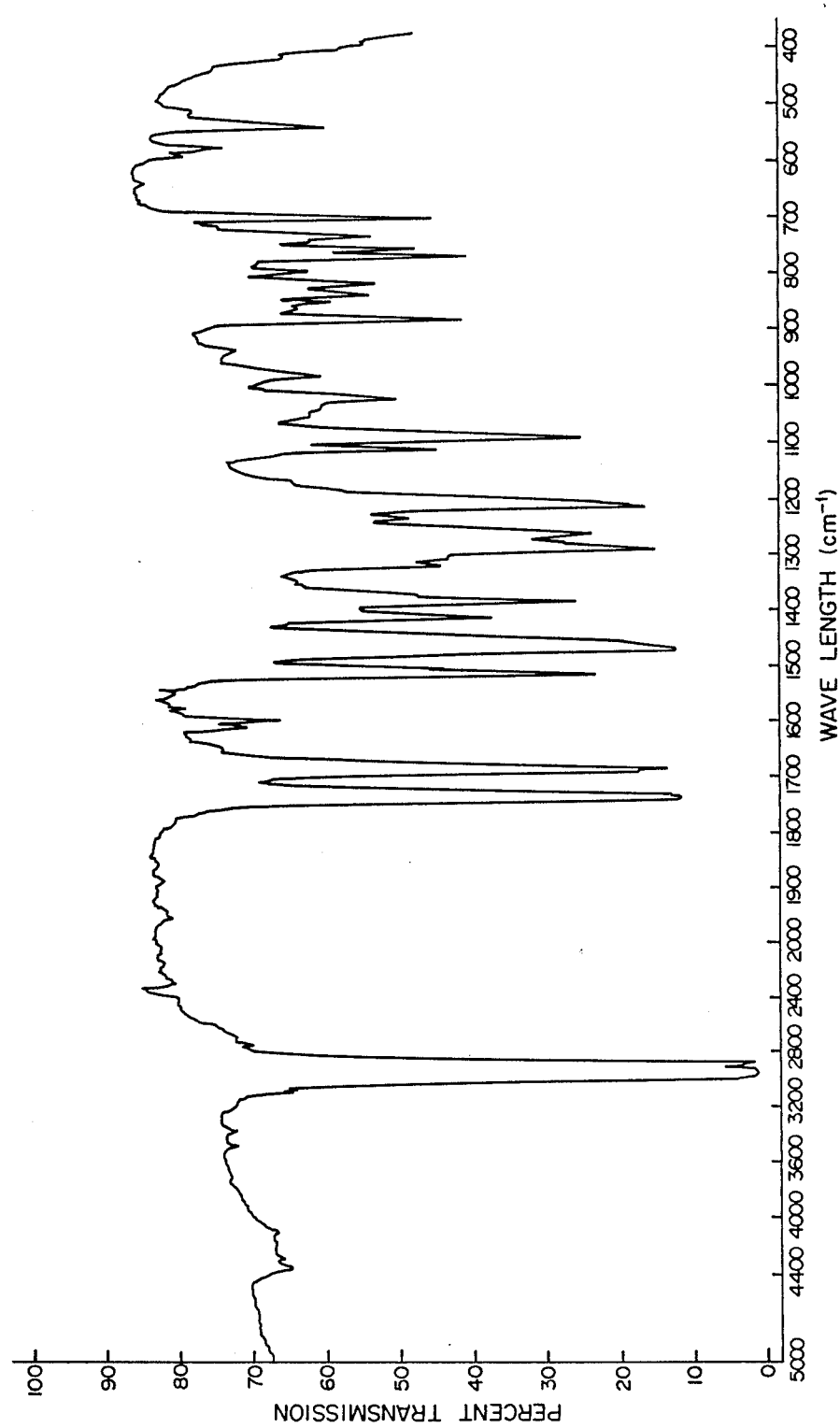
Figure 29:
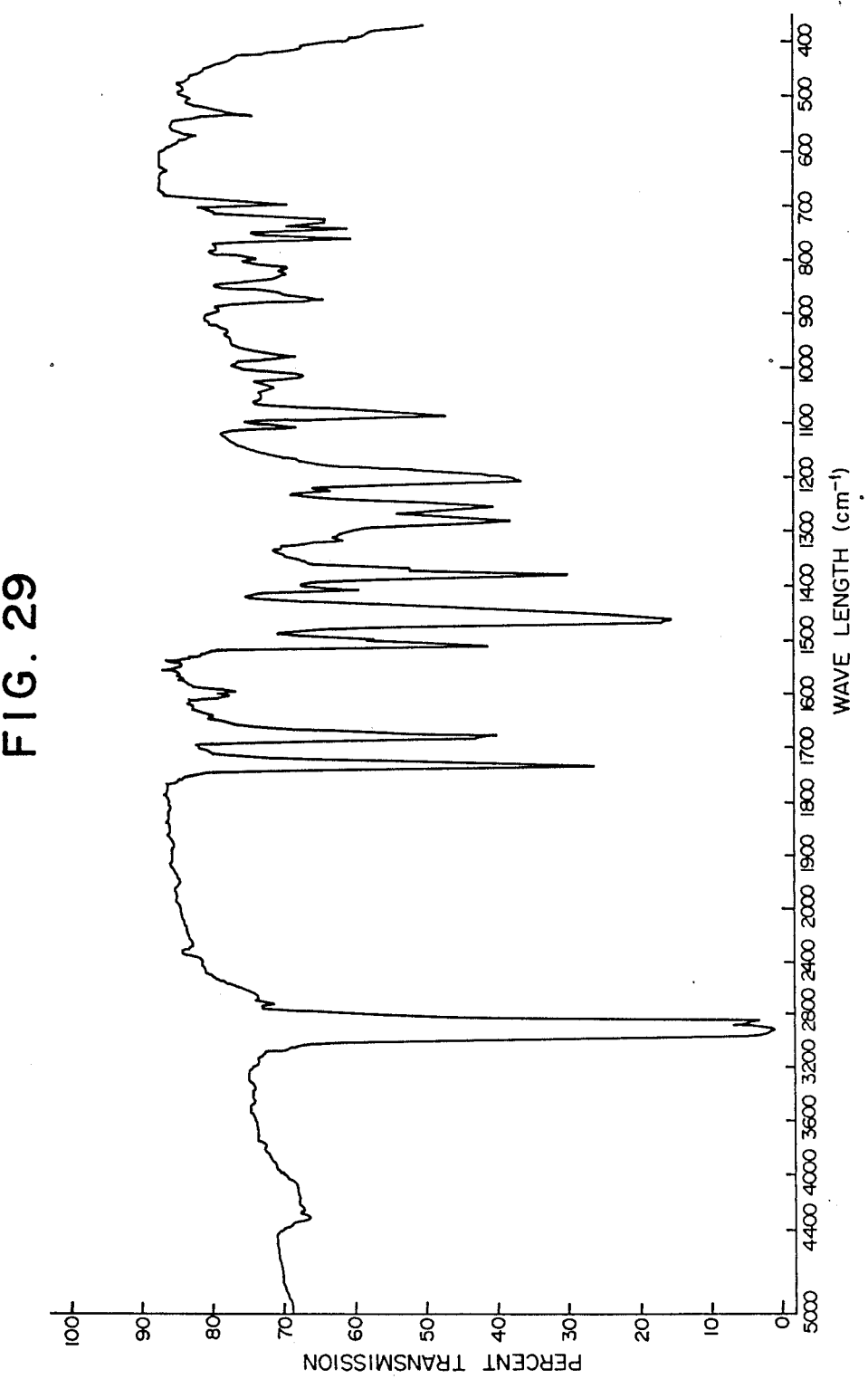
Figure 30:
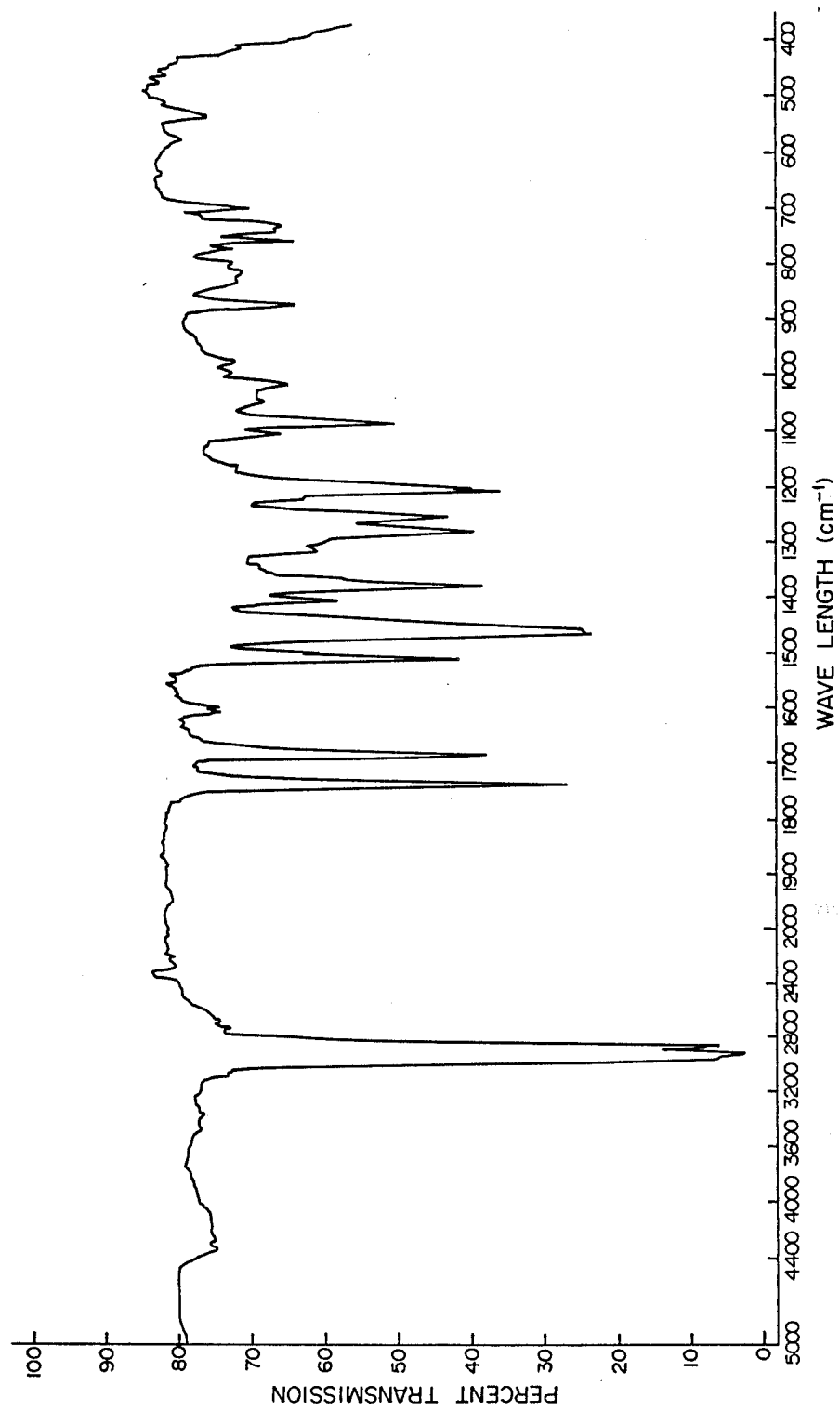
Figure 31:
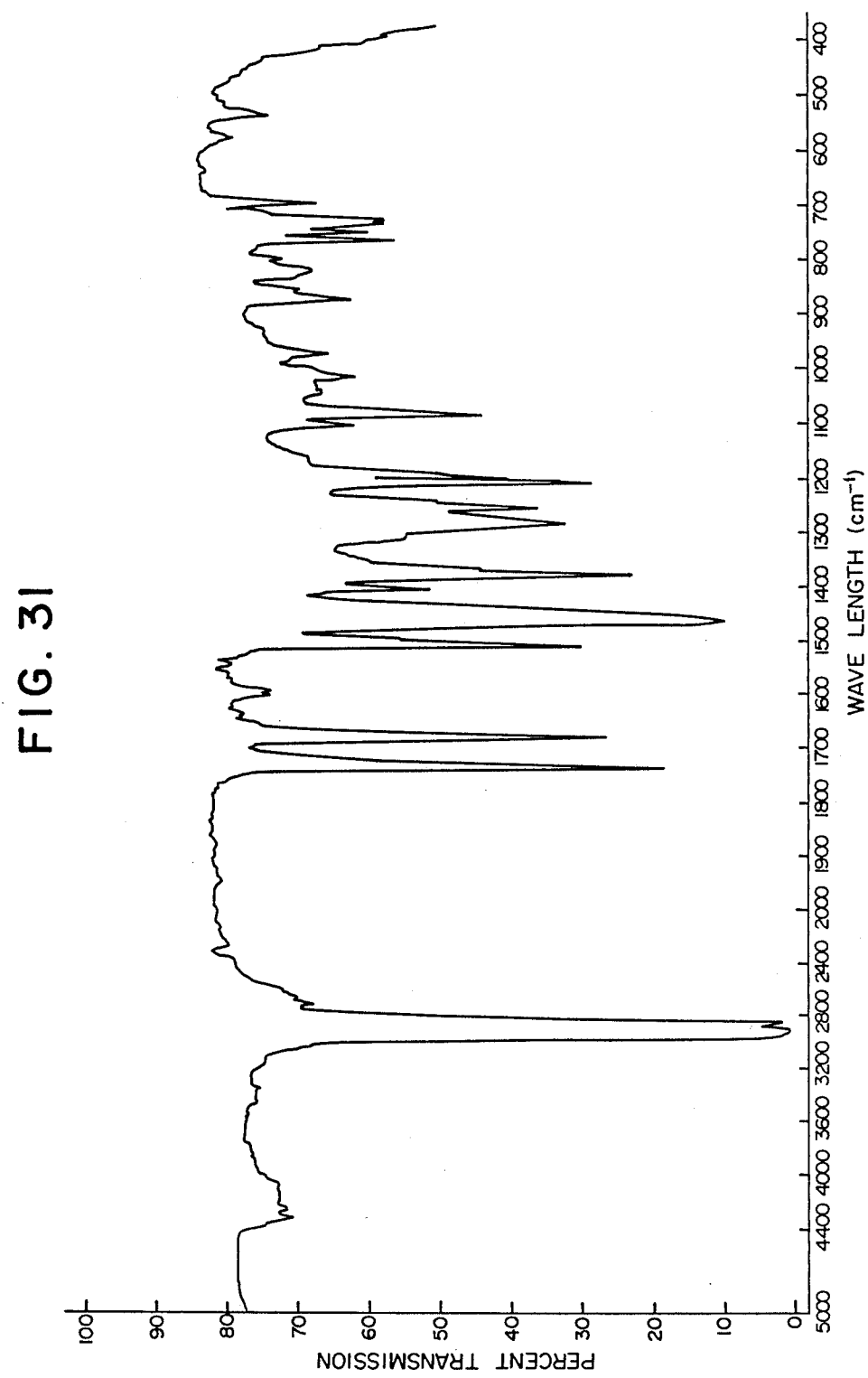
Figure 32:
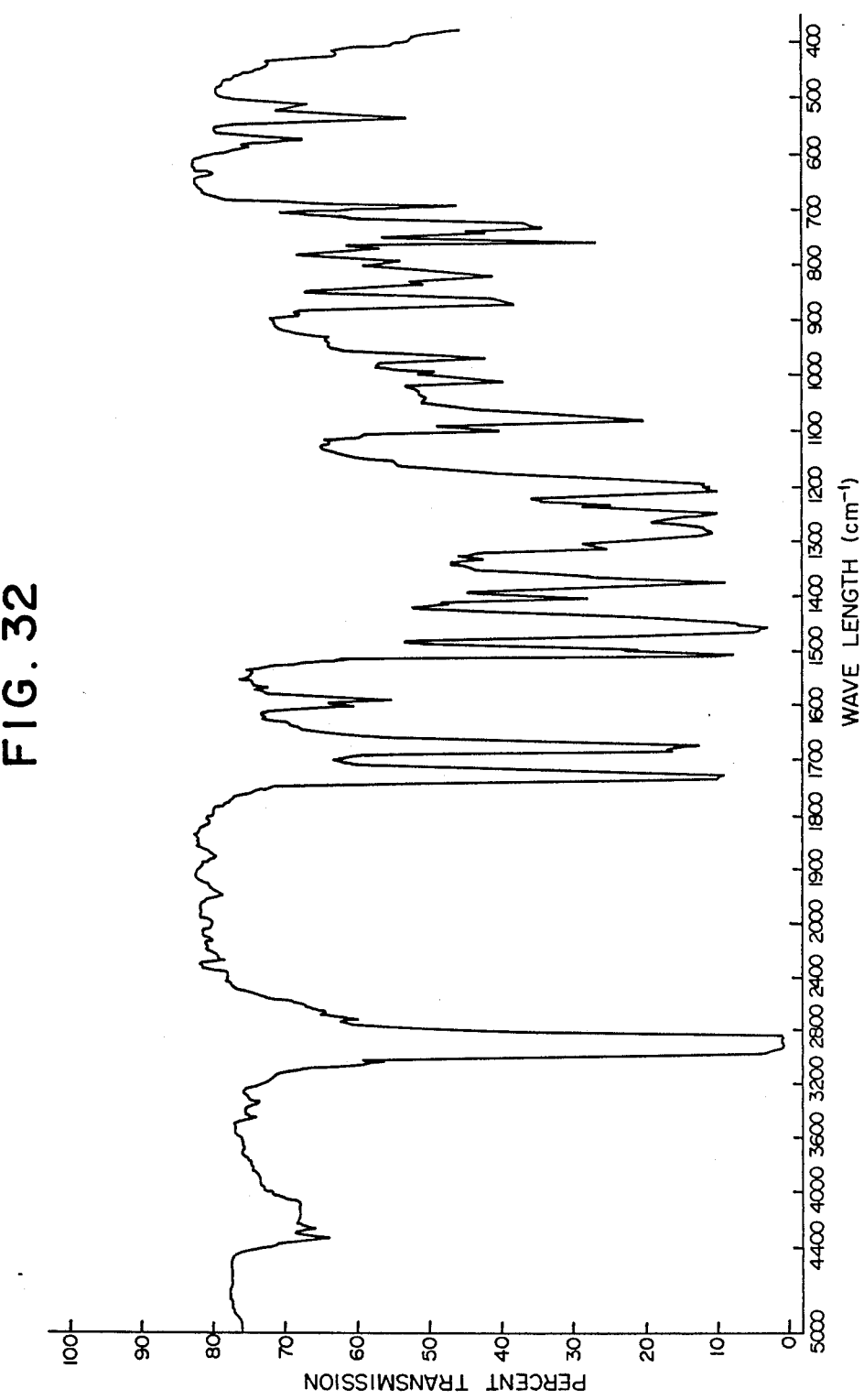
Figure 33:
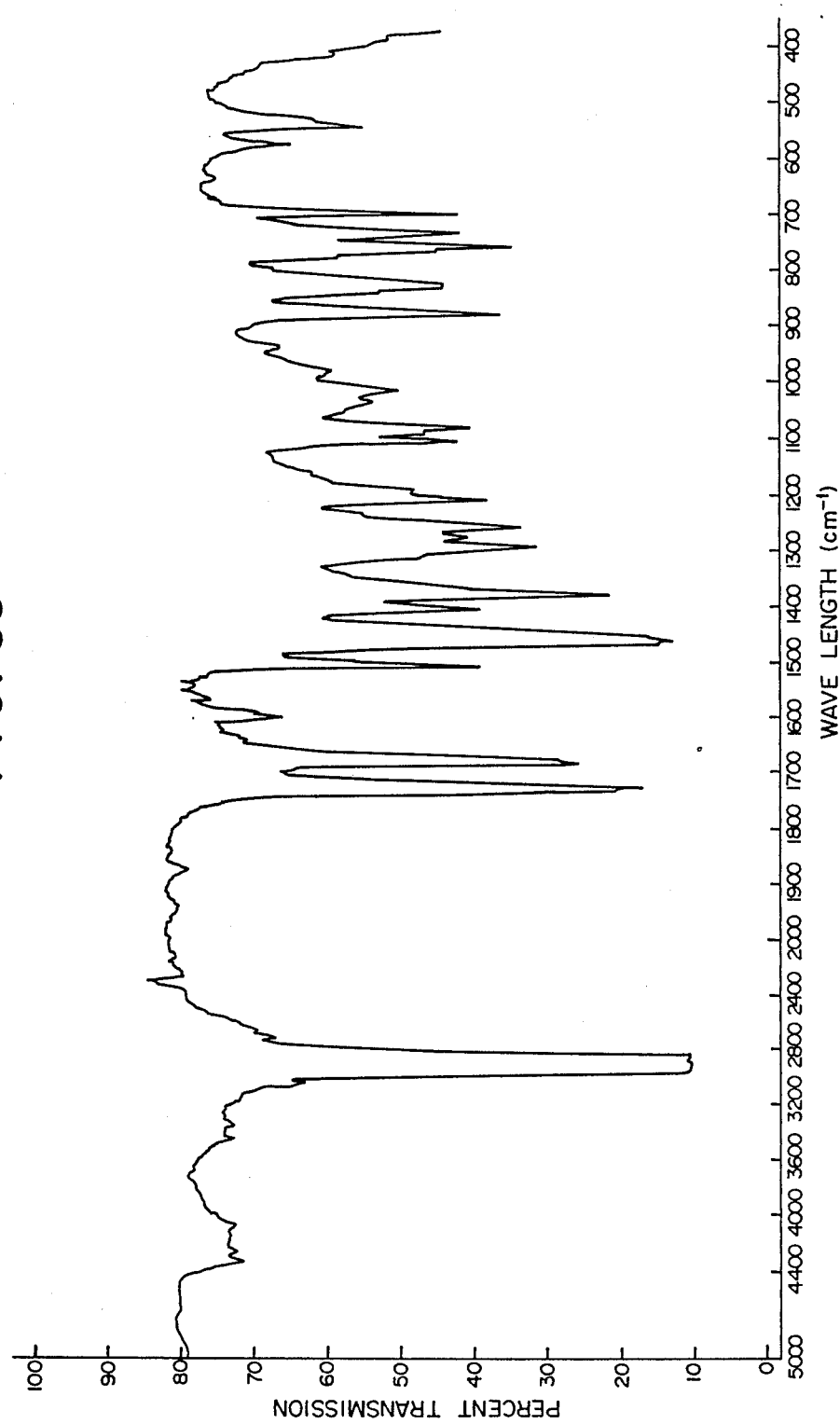
Figure 34:
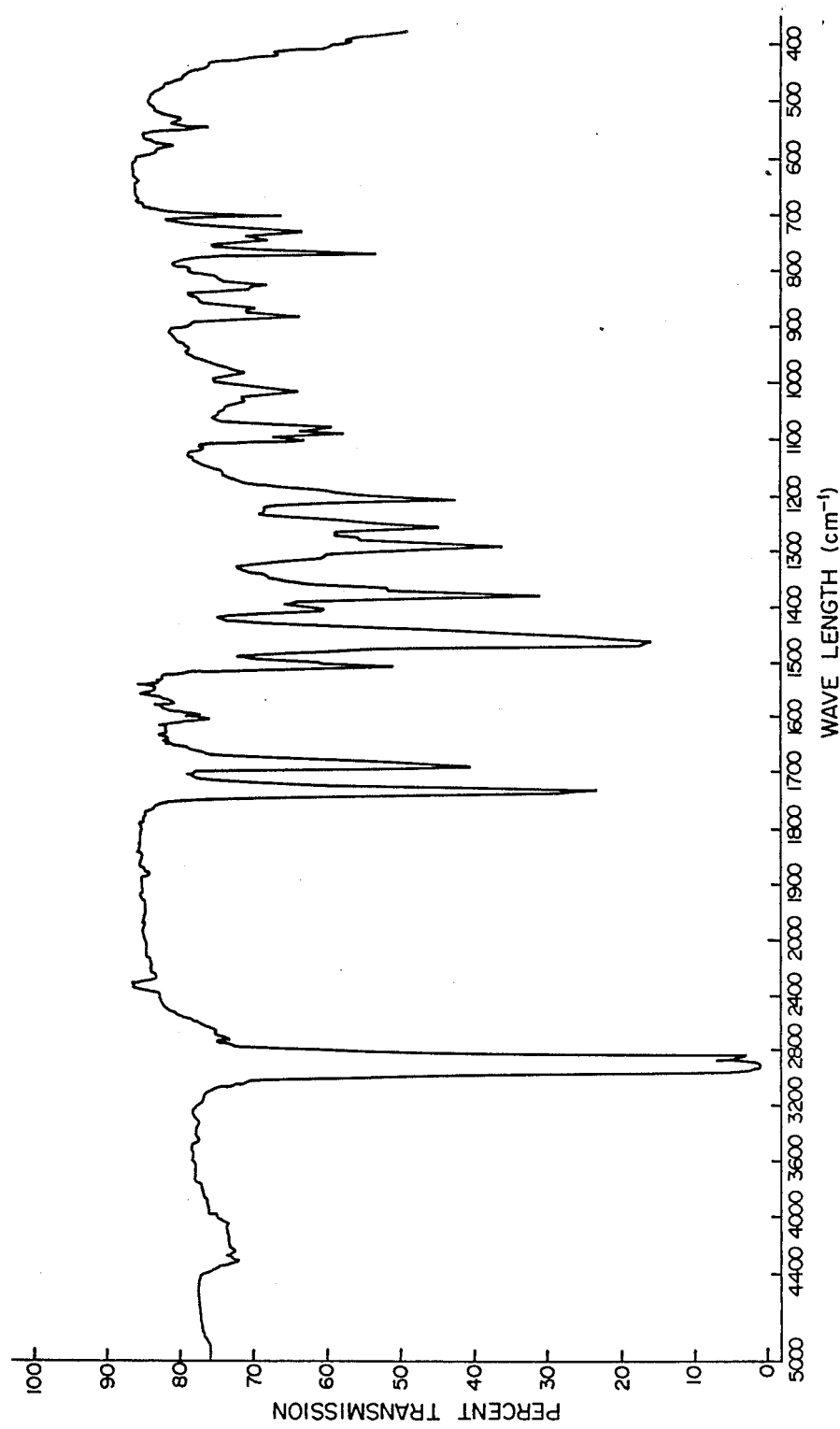
Figure 35:
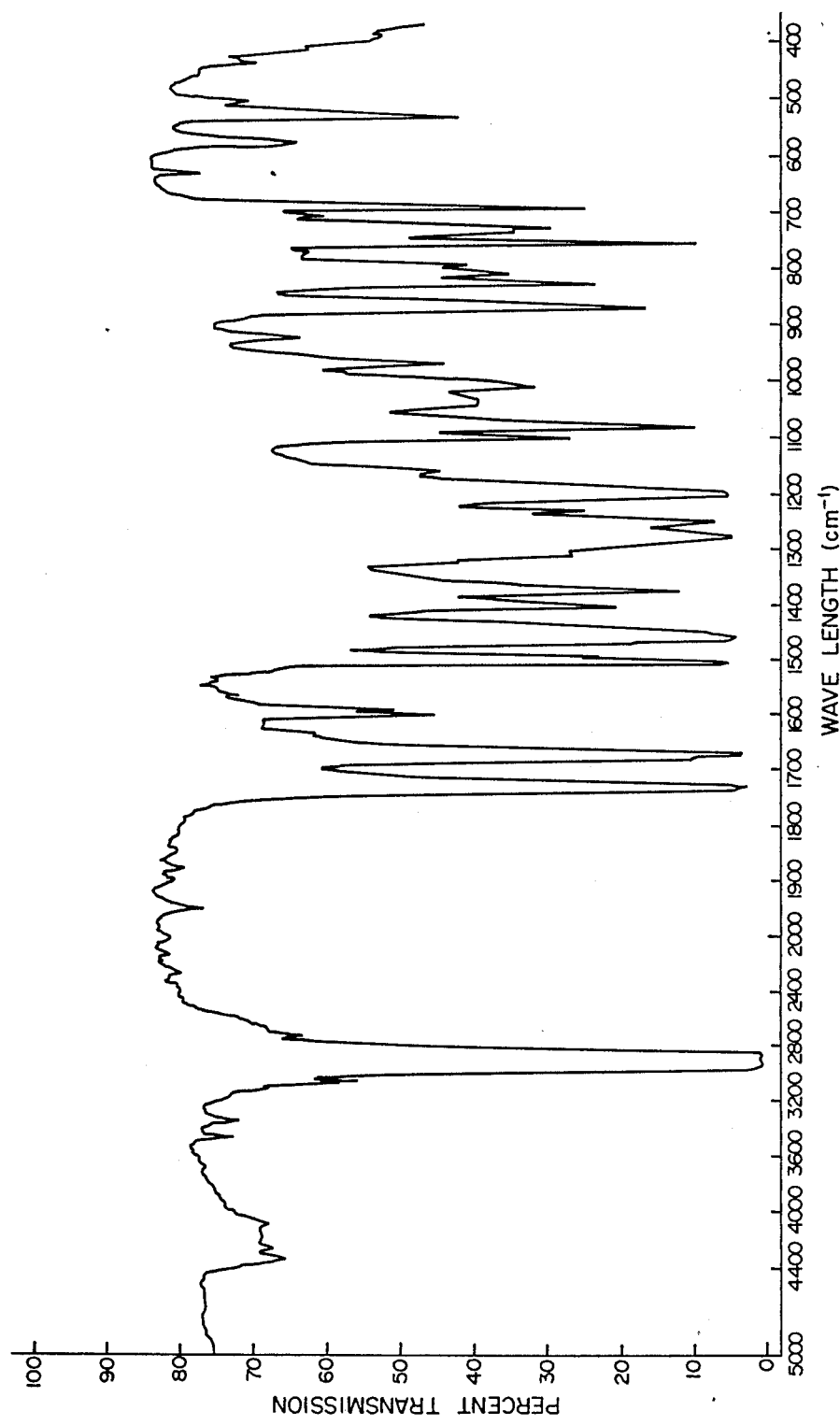
Figure 36:
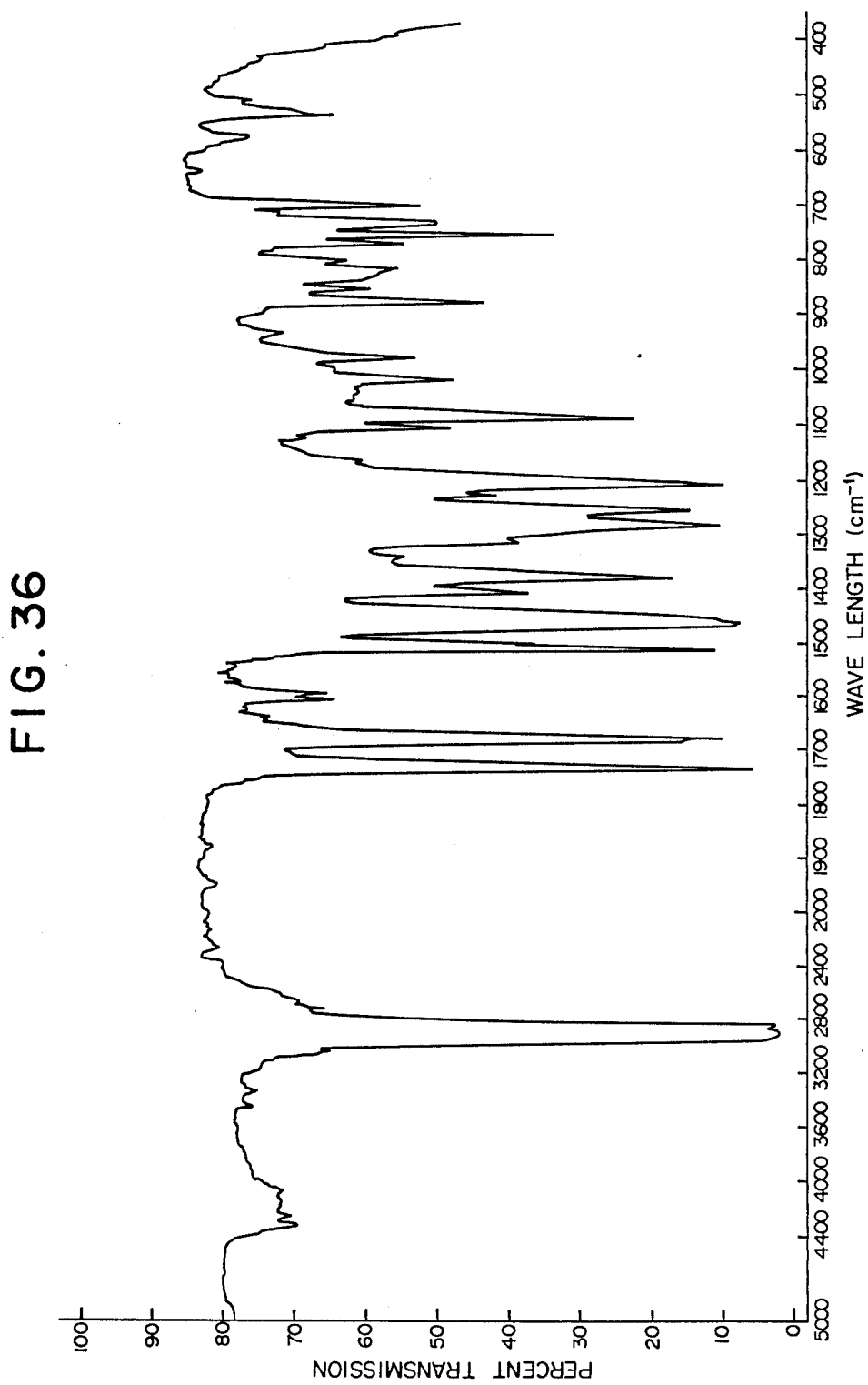
Figure 37:
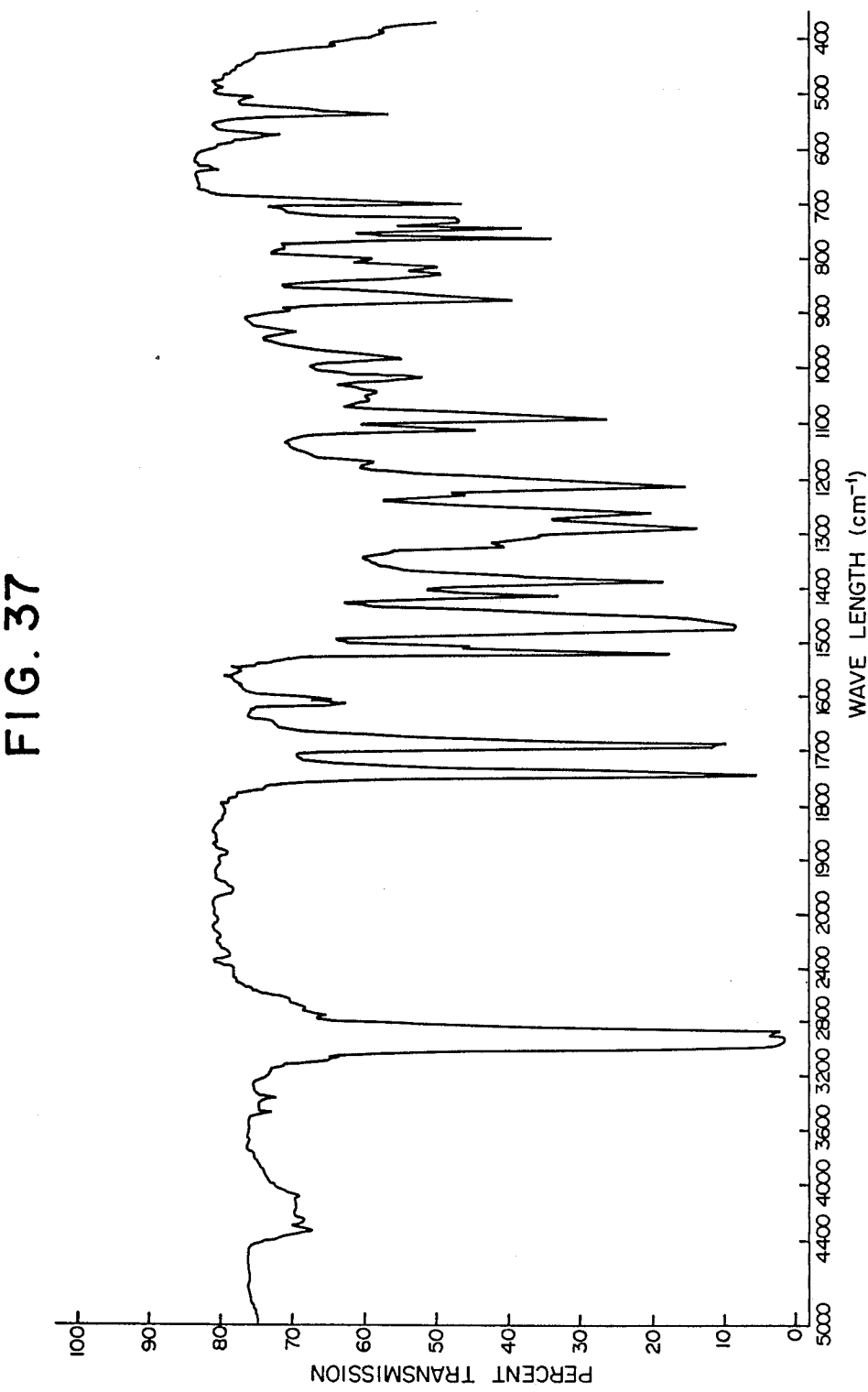
Figure 38:
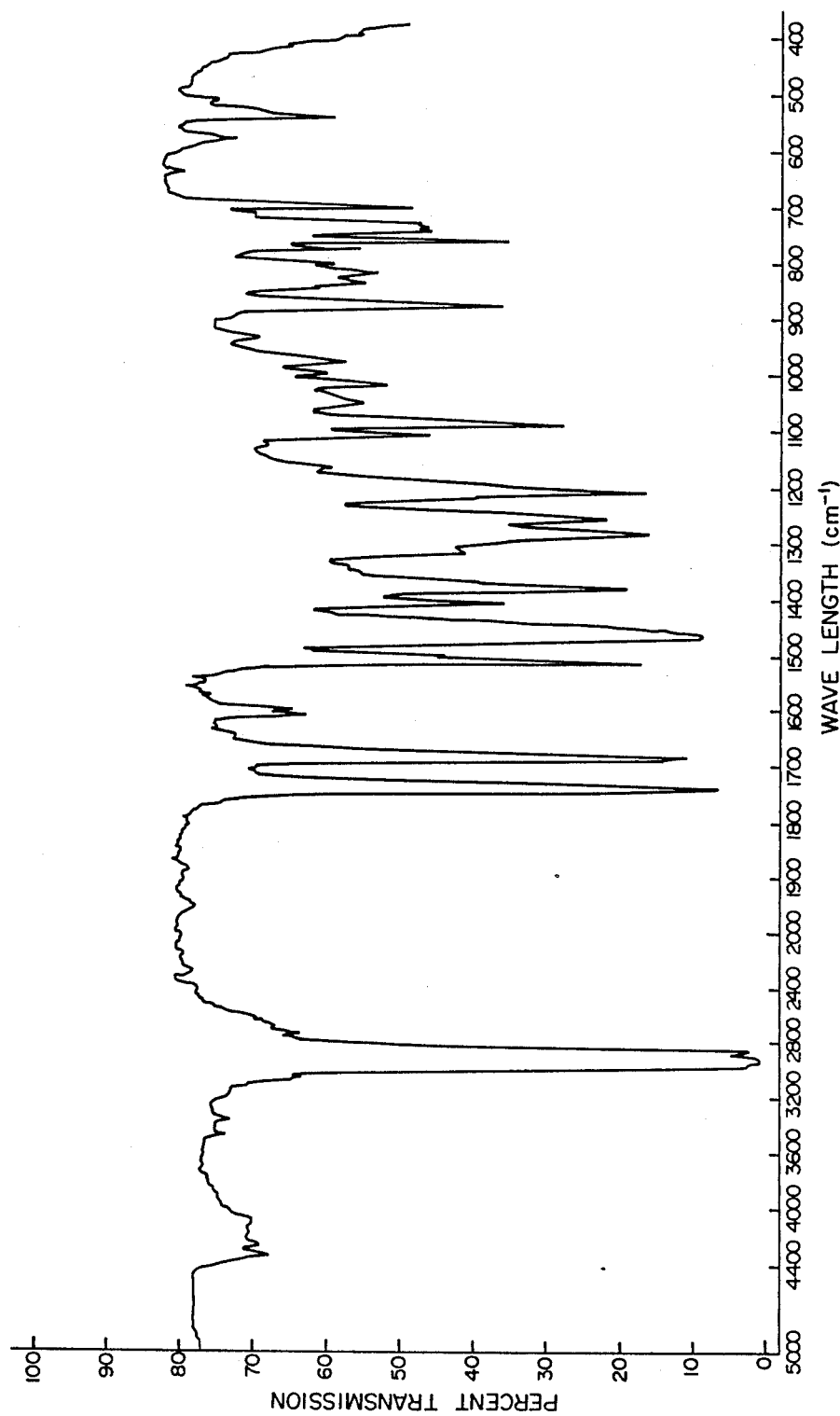
Figure 39:
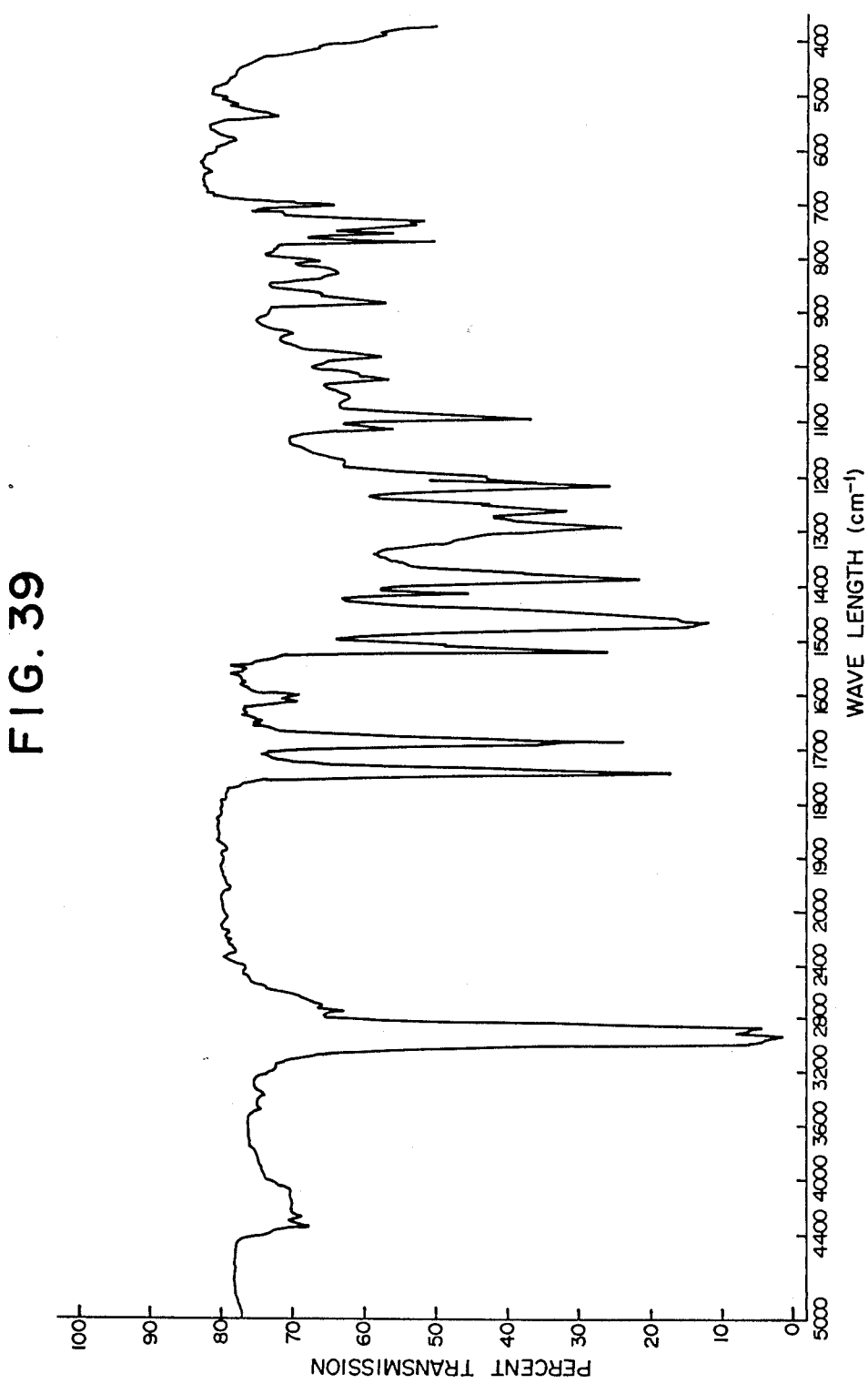
Figure 40:
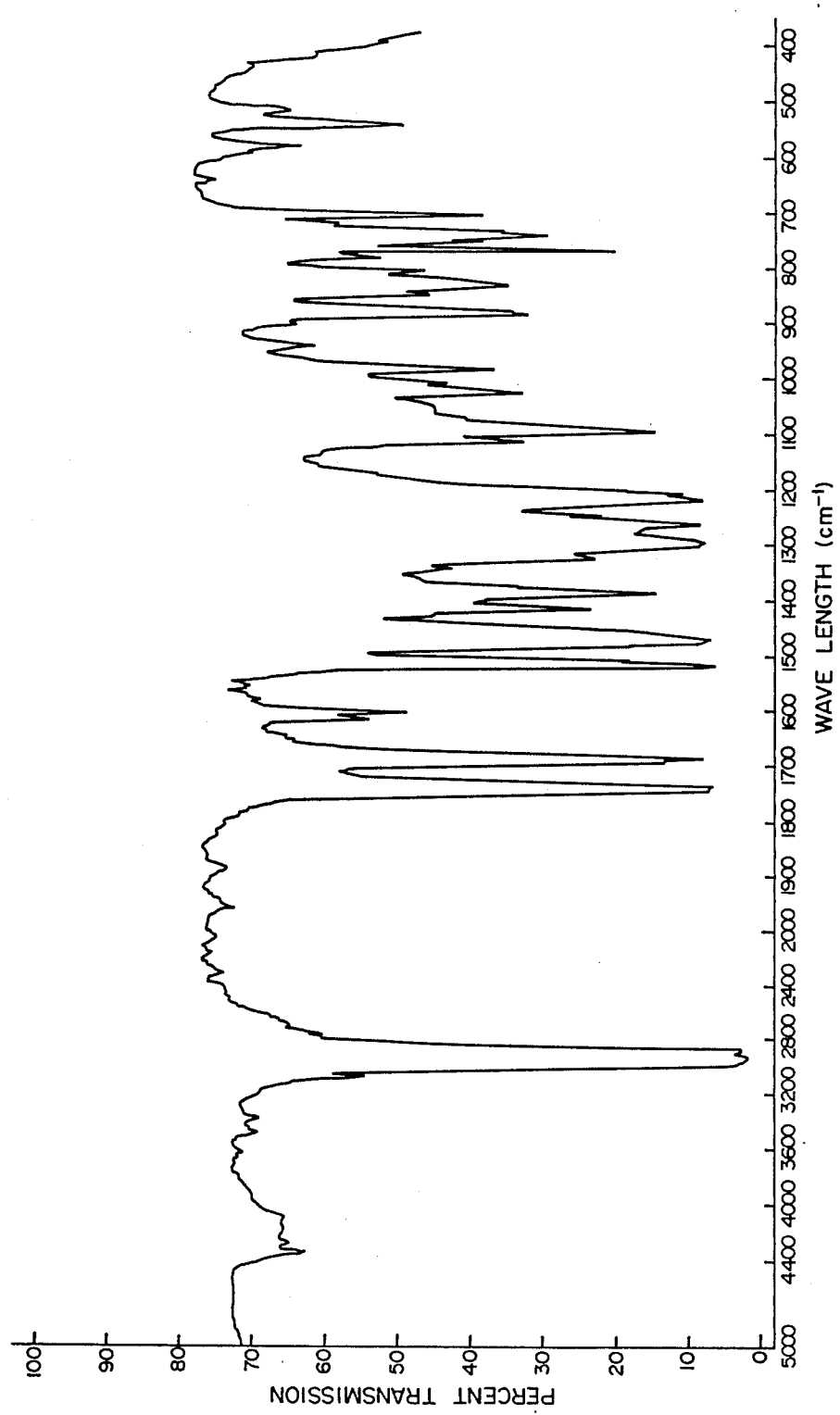

IR-spectrums (KBr) of these compounds are shown in FIGS. 17, 25 and 33, respectively.

Table 1 shows NMR spectrum of the above compounds.

EXAMPLE 2

Optically active 4-alkyloxyphenyl 4'-n-alkanoylbenzoates where n=6 and m=5, 7, 8 and 9, respectively, in the formula V.

(1) 4-n-Heptanoylbenzoic acid n-Hexylbromide (109.2 g, 0.662 mol), Mg (16.1 g, 0.662 mol), cadmium chloride (60.7 g) and terephthalyl chloride (268.6 g, 1.324 mol) were allowed to react in the similar manner to Example 1 to prepare the titled acid (41.6 g). Yield 26.9%.

(2) Objective esters

Esters (Nos. 2, 10, 18 and 26) (about 9 mmol each) were obtained in the similar manner to Examples 1, 2).

IR spectrums are shown in FIGS. 10, 18, 26 and 34, respectively.

Table 1 shows NMR spectrums of the above compounds.

EXAMPLE 3

Optically active 4-alkyloxyphenyl 4'-n-alkanoylbenzoates where n=7 and m=5, 7, 8 and 9, respectively, in the formula V.

(1) 4-n-Octanoylbenzoic acid n-Heptylbromide (118.5 g, 0.662 mol), Mg (16.1 g, 0.662 mol), cadmium chloride (60.7 g) and terephthalylchloride (268.6 g, 1.324 mol) were allowed to react in the similar manner to Example 1 to prepare the titled acid (50.5 g). Yield 30.8%.

(2) Objective esters

Esters (Nos. 3, 11, 19 and 27) (about 9 mmol each) were obtained in the similar manner to Examples 1, 2).

IR spectrums are shown in FIGS. 11, 19, 27 and 35, respectively.

Table 1 shows NMR spectrums of the above compounds.

EXAMPLE 4

Optically active 4-alkyloxyphenyl 4'-n-alkanoylbenzoates (formula V) in which n=8 and m=5, 7, 8 and 9.

(1) 4-n-Nonanoylbenzoic acid (A) n-Octylbromide (73.7 g, 0.382 mol) in THF (200 ml)
(B) Mg (9.28 g, 0.382 mol) in THF (40 ml)

A part of (A) was charged in (B) to cause a reaction at room temperature. The remainder of (A) was added in dropwise over one hour. After the addition was over, the mixture was refluxed under heating for 4 hours. Reflux was further continued for 2 hours in the presence of cadmium chloride (35.0 g), before cooling. The Grignard reagent thus prepared was added drop by drop to terephthalyl chloride (155.0 g, 0.764 mol) solution in THF (1 l) over one hour. After being stirred for 3 hours at room temperature, the mixture was heated to 50° C. and stirred for 12 hours. Furthermore, methanol (150 ml) and pyridine (120 ml) were added at room temperature and stirring was continued for 6 hours. The solution was filtered and the filtrate was distilled under reduced pressure. The residue obtained was subjected to column chromatography (silica gel). The ester obtained (34.5 g) was hydrolyzed with alcoholic caustic potash to obtain n-nonanoylbenzoic acid (31.5 g, yield 31.8%).

(2) Objective esters

Esters (Nos. 4, 12, 20 and 28) (about 0.895 mmol each) were obtained in the similar manner to Examples 1, 2).

IR spectrums are shown in FIGS. 12, 19, 28 and 36, respectively.

Table 1 shows NMR spectrums of the above compounds.

EXAMPLE 5

Optically active 4-alkyloxyphenyl 4'-n-alkanoylbenzoates where n=9, m=5, 7, 8 and 9, respectively in the formula V.

(1) 4-n-Decanoylbenzoic acid n-Nonylbromide (80.0 g, 0.387 mol), Mg (9.40 g, 0.387 mol), cadmium chloride (35.5 g) and terephthalyl chloride (157.0 g, 0.773 mol) were allowed to react in the similar manner to Example 1 to prepare the titled acid (26.5 g). Yield 24.8%.

(2) Objective esters

Esters (Nos. 5, 13, 21 and 29) (about 0.9 mmol each) were obtained in the similar manner to Examples 1, 2).

IR spectrums are shown in FIGS. 13, 21, 29 and 37, respectively.

Table 1 shows NMR spectrums of the above compounds.

EXAMPLE 6

Optically active 4-alkyloxyphenyl 4'-n-alkanoylbenzoates where n=10, m=5, 7, 8 and 9, respectively, in the formula V (1) 4-n-Undecanoylbenzoic acid n-Decylbromide (76.2 g, 0.345 mol), Mg (8.38 g, 0.345 mol), cadmium chloride (31.7 g) and terephthalyl chloride (140.1 g, 0.690 mol) were allowed to react in the similar manner to Example 1 to prepare the titled acid (25.7 g). Yield 25.7%.

(2) Objective esters

Esters (Nos. 6, 14, 22 and 30) (about 0.9 mmol each) were obtained in the similar manner to Examples 1, 2).

IR spectrums are shown in FIGS. 14, 22, 30 and 38, respectively.

Table 1 shows NMR spectrums of the above compounds.

EXAMPLE 7

Optically active 4-alkyloxyphenyl 4'-n-alkanoylbenzoates where n=11, m=5, 7, 8 and 9, respectively in the formula V.

(1) 4-n-Dodecanoylbenzoic acid n-Undecylbromide (117.5 g, 0.500 mol), Mg (12.2 g, 0.500 mol), cadmium chloride (45.8 g) and terephthalyl chloride (202.9 g, 1.00 mol) were allowed to react in the similar manner to Example 1 to prepare the titled acid (32.3 g). Yield 21.3%.

(2) Objective esters

Esters (Nos. 7, 15, 23 and 31) (about 0.9 mmol each) were obtained in the similar manner to Examples 1, 2).

IR spectrums are shown in FIGS. 15, 23, 31 and 39, respectively.

Table 1 shows NMR spectrums of the above compounds.

EXAMPLE 8

Optically active 4-alkyloxyphenyl 4'-n-alkanoylbenzoates where n=12 and m=5, 7, 8 and 9, respectively, in the formula V.

(1) 4-n-Tridecanoylbenzoic acid n-Dodecylbromide (124.5 g, 0.500 mol), Mg (12.2 g, 0.500 mol), cadmium chloride (45.8 g) and terephthalyl chloride (202.9 g, 1.00 mol) were allowed to react in the similar manner to Example 1 to prepare the titled acid (28.5 g). Yield 17.9%.

(2) Objective esters

Esters (Nos. 8, 16, 24 and 32) (about 0.9 mmol each) were obtained in the similar manner to Examples 1, 2).

IR spectrums are shown in FIGS. 16, 24, 32 and 40, respectively.

Table 1 shows NMR spectrums of the above compounds.

Tables 2-9 show phase transition temperatures of compound Nos. 1-32 prepared in Examples 1-8, in accordance with differential thermal analysis (SEIKO DENSHI KOGYO, DSC-20). Tables 10-13 show phase transition temperatures of some compounds prepared in Examples 1-8, by use of a hot stage and a polarizing microscope.

FIGS. 1-8 are graphs of carbon numbers in an aliphatic group (n) vs. phase transition temperature of the present optically active 4-alkyloxyphenyl 4'-n-alkanoylbenzoate.

TABLE 1

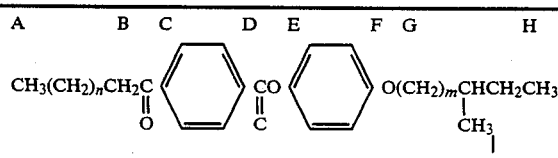

| Compound No. | A ppm | B ppm | C ppm | D ppm | E ppm | F ppm | G ppm | H ppm | Remarks |
|---|---|---|---|---|---|---|---|---|---|
| 1 | 0.85 | 2.97 | 6.86 | 7.09 | 7.98 | 8.22 | 3.78 | 0.78 | G: doublet |
| 2 | 0.85 | 2.97 | 6.86 | 7.09 | 7.98 | 8.22 | 3.78 | 0.78 | " |
| 3 | 0.85 | 2.97 | 6.86 | 7.09 | 7.98 | 8.22 | 3.78 | 0.78 | " |
| 4 | 0.85 | 2.97 | 6.86 | 7.09 | 7.98 | 8.22 | 3.78 | 0.78 | " |
| 5 | 0.85 | 2.97 | 6.86 | 7.09 | 7.98 | 8.22 | 3.78 | 0.78 | " |
| 6 | 0.85 | 2.97 | 6.86 | 7.09 | 7.98 | 8.22 | 3.78 | 0.78 | " |
| 7 | 0.85 | 2.97 | 6.86 | 7.09 | 7.98 | 8.22 | 3.78 | 0.78 | " |
| 8 | 0.85 | 2.97 | 6.86 | 7.09 | 7.98 | 8.22 | 3.78 | 0.78 | " |
| 9 | 0.85 | 2.97 | 6.86 | 7.09 | 7.98 | 8.22 | 3.90 | 0.85 | G: triplet |
| 10 | 0.85 | 2.97 | 6.86 | 7.09 | 7.98 | 8.22 | 3.90 | 0.85 | " |
| 11 | 0.85 | 2.97 | 6.86 | 7.09 | 7.98 | 8.22 | 3.90 | 0.85 | " |
| 12 | 0.85 | 2.97 | 6.86 | 7.09 | 7.98 | 8.22 | 3.90 | 0.85 | " |
| 13 | 0.85 | 2.97 | 6.86 | 7.09 | 7.98 | 8.22 | 3.90 | 0.85 | " |
| 14 | 0.85 | 2.97 | 6.86 | 7.09 | 7.98 | 8.22 | 3.90 | 0.85 | " |
| 15 | 0.85 | 2.97 | 6.86 | 7.09 | 7.98 | 8.22 | 3.90 | 0.85 | " |
| 16 | 0.85 | 2.97 | 6.86 | 7.09 | 7.98 | 8.22 | 3.90 | 0.85 | " |
| 17 | 0.85 | 2.97 | 6.86 | 7.09 | 7.98 | 8.22 | 3.90 | 0.85 | " |
| 18 | 0.85 | 2.97 | 6.86 | 7.09 | 7.98 | 8.22 | 3.90 | 0.85 | " |
| 19 | 0.85 | 2.97 | 6.86 | 7.09 | 7.98 | 8.22 | 3.90 | 0.85 | " |
| 20 | 0.85 | 2.97 | 6.86 | 7.09 | 7.98 | 8.22 | 3.90 | 0.85 | " |
| 21 | 0.85 | 2.97 | 6.86 | 7.09 | 7.98 | 8.22 | 3.90 | 0.85 | " |
| 22 | 0.85 | 2.97 | 6.86 | 7.09 | 7.98 | 8.22 | 3.90 | 0.85 | " |
| 23 | 0.85 | 2.97 | 6.86 | 7.09 | 7.98 | 8.22 | 3.90 | 0.85 | " |
| 24 | 0.85 | 2.97 | 6.86 | 7.09 | 7.98 | 8.22 | 3.90 | 0.85 | " |
| 25 | 0.85 | 2.97 | 6.86 | 7.09 | 7.98 | 8.22 | 3.90 | 0.85 | " |
| 26 | 0.85 | 2.97 | 6.86 | 7.09 | 7.98 | 8.22 | 3.90 | 0.85 | " |
| 27 | 0.85 | 2.97 | 6.86 | 7.09 | 7.98 | 8.22 | 3.90 | 0.85 | " |
| 28 | 0.85 | 2.97 | 6.86 | 7.09 | 7.98 | 8.22 | 3.90 | 0.85 | " |
| 29 | 0.85 | 2.97 | 6.86 | 7.09 | 7.98 | 8.22 | 3.90 | 0.85 | " |
| 30 | 0.85 | 2.97 | 6.86 | 7.09 | 7.98 | 8.22 | 3.90 | 0.85 | " |
| 31 | 0.85 | 2.97 | 6.86 | 7.09 | 7.98 | 8.22 | 3.90 | 0.85 | " |
| 32 | 0.85 | 2.97 | 6.86 | 7.09 | 7.98 | 8.22 | 3.90 | 0.85 | " |

Notes
(1) Signal of 7.21 ppm: signal of chloroform in heavy hydrogen chloroform solvent
(2) Signal of 1.60 ppm: signal of impurities in heavy hydrogen chloroform solvent
(3) Signal of proton of I: observed at 0.97 ppm in doublet as to compound Nos. 1–16 but aggradated in signal of the other protons in the remaining compounds
Apparatus: Nihon Denshi Mfg. Co., Ltd. FX-60Q (60 MHz)

TABLE 2 (Example 1)

| Compound No. | n-m* | while temperature is increasing (°C.) | while temperature is decreasing (°C.) |
|---|---|---|---|
| 1 | 5-5* | 71, 86, 96, 99 | 92, 66 |
| 9 | 5-7* | 55, 77, 109 | 107, 67 |
| 17 | 5-8* | 77, 107 | 106, 65 |
| 25 | 5-9* | 61, 76, 113 | 112, 63 |

TABLE 3 (Example 2)

| Compound No. | n-m* | while temperature is increasing (°C.) | while temperature is decreasing (°C.) |
|---|---|---|---|
| 2 | 6-5* | 81, 101 | 101, 64 |
| 10 | 6-7* | 75, 111 | 109, 63 |
| 18 | 6-8* | 76, 108 | 107, 62 |
| 26 | 6-9* | 69, 76, 115 | 114, 68 |

TABLE 4 (Example 3)

| Compound No. | n-m* | while temperature is increasing (°C.) | while temperature is decreasing (°C.) |
|---|---|---|---|
| 3 | 7-5* | 53, 61, 98 | 96, 55 |
| 11 | 7-7* | 58, 75, 109 | 109, 62 |
| 19 | 7-8* | 73, 104 | 102, 62, 50 |
| 27 | 7-9* | 74, 111 | 109, 68 |

TABLE 5 (Example 4)

| Compound No. | n-m* | while temperature is increasing (°C.) | while temperature is decreasing (°C.) |
|---|---|---|---|
| 4 | 8-5* | 64, 74, 99 | 98, 65 |
| 12 | 8-7* | 60, 66, 109 | 108, 58 |
| 20 | 8-8* | 65, 73, 105 | 102, 50 |
| 28 | 8-9* | 59, 69, 112 | 110, 66 |

TABLE 6 (Example 5)

| Compound No. | n-m* | while temperature is increasing (°C.) | while temperature is decreasing (°C.) |
|---|---|---|---|
| 5 | 9-5* | 70, 73, 96 | 95, 66 |
| 13 | 9-7* | 72, 107 | 106, 64 |
| 21 | 9-8* | 62, 104 | 103, 63 |
| 29 | 9-9* | 77, 110 | 109, 67 |

TABLE 7
(Example 6)

| Compound No. | n-m* | while temperature is increasing (°C.) | while temperature is decreasing (°C.) |
|---|---|---|---|
| 6 | 10-5* | 80, 98 | 96, 70 |
| 14 | 10-7* | 74, 107 | 105, 67 |
| 22 | 10-8* | 69, 72, 104 | 106, 64 |
| 30 | 10-9* | 75, 109 | 109, 67 |

TABLE 8
(Example 7)

| Compound No. | n-m* | while temperature is increasing (°C.) | while temperature is decreasing (°C.) |
|---|---|---|---|
| 7 | 11-5* | 70, 78, 96 | 95, 69 |
| 15 | 11-7* | 64, 75, 106 | 105, 68 |
| 23 | 11-8* | 68, 99 | 98, 61 |
| 31 | 11-9* | 71, 75, 106 | 105, 66 |

TABLE 9
(Example 8)

| Compound No. | n-m* | while temperature is increasing (°C.) | while temperature is decreasing (°C.) |
|---|---|---|---|
| 8 | 12-5* | 83, 95 | 93, 74 |
| 16 | 12-7* | 80, 105 | 104, 73 |
| 24 | 12-8* | 68, 75, 100 | 98, 67 |
| 32 | 12-9* | 71, 77, 105 | 104, 69 |

TABLE 10

| No. | n-m* | Phase Transition Temperature (°C.) |
|---|---|---|
| 1 | 5-5* | Cr. $\xrightleftharpoons[67.1]{74.0}$ $S_A$ $\xrightleftharpoons[94.5]{89.0}$ ISO. |
| 2 | 6-5* | Cr. $\xrightleftharpoons[62.8]{81.7}$ $S_A$ $\xrightleftharpoons[101.0]{101.8}$ ISO. |
| 3 | 7-5* | Cr. $\xrightleftharpoons[54.8]{55.8}$ $S_A$ $\xrightleftharpoons[98.0]{96.8}$ ISO. |
| 4 | 8-5* | Cr. $\xrightleftharpoons[67.2]{75.0}$ $S_A$ $\xrightleftharpoons[98.8]{98.1}$ ISO. |
| 5 | 9-5* | Cr. $\xrightleftharpoons[68.8]{77.1}$ $S_A$ $\xrightleftharpoons[99.5]{100.0}$ ISO. |
| 6 | 10-5* | Cr. $\xrightleftharpoons[68.6]{78.5}$ $S_A$ $\xrightleftharpoons[89.7]{93.0}$ ISO. |
| 7 | 11-5* | Cr. $\xrightleftharpoons[69.0]{78.0}$ $S_A$ $\xrightleftharpoons[96.3]{95.8}$ ISO. |
| 8 | 12-5* | Cr. $\xrightleftharpoons[69.5]{78.3}$ $S_A$ $\xrightleftharpoons[94.5]{95.2}$ ISO. |

TABLE 11

| No. | n-m* | Phase Transition Temperature (°C.) |
|---|---|---|
| 9 | 5-7* | Cr. $\xrightleftharpoons[64.2]{77.9}$ $S_A$ $\xrightleftharpoons[109.4]{109.8}$ ISO. |
| 10 | 6-7* | Cr. $\xrightleftharpoons[63.8]{77.1}$ $S_A$ $\xrightleftharpoons[109.9]{110.7}$ ISO. |
| 11 | 7-7* | Cr. $\xrightleftharpoons[59.7]{—}$ $Sc^*$ $\xrightleftharpoons[72.4]{76.2}$ $S_A$ $\xrightleftharpoons[109.8]{110.0}$ ISO. |
| 12 | 8-7* | Cr. $\xrightleftharpoons[60.9]{66.1}$ $Sc^*$ $\xrightleftharpoons[89.1]{89.0}$ $S_A$ $\xrightleftharpoons[109.8]{109.4}$ ISO. |
| 13 | 9-7* | Cr. $\xrightleftharpoons[66.1]{68.4}$ $Sc^*$ $\xrightleftharpoons[89.6]{90.0}$ $S_A$ $\xrightleftharpoons[108.0]{111.6}$ ISO. |
| 14 | 10-7* | Cr. $\xrightleftharpoons[67.1]{74.1}$ $Sc^*$ $\xrightleftharpoons[90.2]{90.2}$ $S_A$ $\xrightleftharpoons[103.3]{103.0}$ ISO. |
| 15 | 11-7* | Cr. $\xrightleftharpoons[68.3]{76.4}$ $Sc^*$ $\xrightleftharpoons[90.9]{91.0}$ $S_A$ $\xrightleftharpoons[104.8]{105.2}$ ISO. |
| 16 | 12-7* | Cr. $\xrightleftharpoons[73.1]{81.3}$ $Sc^*$ $\xrightleftharpoons[90.7]{91.0}$ $S_A$ $\xrightleftharpoons[105.1]{104.5}$ ISO. |

TABLE 11-continued

| No. | n–m* | Phase Transition Temperature (°C.) |
|---|---|---|

TABLE 12

| No. | n–m* | Phase Transition Temperature (°C.) |
|---|---|---|
| 17 | 5-8* | Cr. $\xrightleftharpoons[65.0]{78.2}$ S$_A$ $\xrightleftharpoons[106.4]{106.2}$ ISO. |
| 18 | 6-8* | Cr. $\xrightleftharpoons[63.1]{78.0}$ S$_A$ $\xrightleftharpoons[102.0]{108.0}$ ISO. |
| 19 | 7-8* | Cr. $\xrightleftharpoons[61.8]{68.9}$ S$_A$ $\xrightleftharpoons[102.5]{95.2}$ ISO. |
| 20 | 8-8* | Cr. $\xrightleftharpoons[54.3]{66.8}$ Sc* $\xrightleftharpoons[73.8]{81.1}$ S$_A$ $\xrightleftharpoons[105.8]{106.1}$ ISO. |
| 21 | 9-9* | Cr. $\xrightleftharpoons[63.6]{73.2}$ Sc* $\xrightleftharpoons[89.6]{90.6}$ S$_A$ $\xrightleftharpoons[104.5]{104.6}$ ISO. |
| 22 | 10-9* | Cr. $\xrightleftharpoons[65.4]{71.7}$ S$_X$ $\xrightleftharpoons[84.2]{76.9}$ S$_c$* $\xrightleftharpoons[95.6]{92.5}$ S$_A$ $\xrightleftharpoons[104.0]{104.6}$ ISO. |
| 23 | 11-9* | Cr. $\xrightleftharpoons[62.0]{66.8}$ Sc* $\xrightleftharpoons[88.1]{81.0}$ S$_A$ $\xrightleftharpoons[100.0]{98.1}$ ISO. |
| 24 | 12-9* | Cr. $\xrightleftharpoons[67.9]{76.1}$ Sc* $\xrightleftharpoons[88.8]{90.2}$ S$_A$ $\xrightleftharpoons[100.2]{99.5}$ ISO. |

TABLE 13

| No. | n–m* | Phase Transition Temperature (°C.) |
|---|---|---|
| 25 | 5-9* | Cr. $\xrightleftharpoons[66.8]{77.1}$ S$_A$ $\xrightleftharpoons[112.8]{113.3}$ ISO. |
| 26 | 6-9* | Cr. $\xrightleftharpoons[68.3]{77.1}$ S$_A$ $\xrightleftharpoons[114.3]{114.5}$ ISO. |
| 27 | 7-9* | Cr. $\xrightleftharpoons[67.5]{75.6}$ S$_A$ $\xrightleftharpoons[110.0]{109.6}$ ISO. |
| 28 | 8-9* | Cr. $\xrightleftharpoons[67.9]{72.5}$ Sc* $\xrightleftharpoons[81.2]{79.2}$ S$_A$ $\xrightleftharpoons[112.0]{110.5}$ ISO. |
| 29 | 9-9* | Cr. $\xrightleftharpoons[67.5]{77.8}$ Sc* $\xrightleftharpoons[96.5]{96.2}$ S$_A$ $\xrightleftharpoons[110.0]{109.6}$ ISO. |
| 30 | 10-9* | Cr. $\xrightleftharpoons[62.2]{76.5}$ Sc* $\xrightleftharpoons[99.7]{98.4}$ S$_A$ $\xrightleftharpoons[109.2]{108.4}$ ISO. |

TABLE 13-continued

| No. | n-m* | Phase Transition Temperature (°C.) |
|---|---|---|
| 31 | 11-9* | Cr. $\underset{68.6}{\overset{72.9}{\rightleftarrows}}$ Sc* $\underset{95.9}{\overset{97.0}{\rightleftarrows}}$ S$_A$ $\underset{105.9}{\overset{105.0}{\rightleftarrows}}$ ISO. |
| 32 | 12-9* | Cr. $\underset{69.4}{\overset{78.0}{\rightleftarrows}}$ Sc* $\underset{90.8}{\overset{88.5}{\rightleftarrows}}$ S$_A$ $\underset{103.2}{\overset{94.0}{\rightleftarrows}}$ ISO. |

We claim:

1. A compound having the formula:

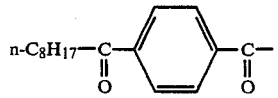
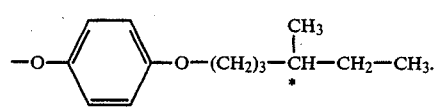

2. A compound having the formula:

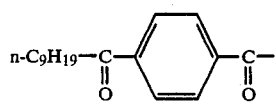
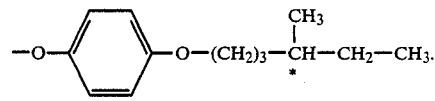

* * * * *